United States Patent
Shimizu et al.

(10) Patent No.: US 6,663,286 B2
(45) Date of Patent: Dec. 16, 2003

(54) METHOD OF DETERMINING RACEWAY SURFACE LENGTH AND ROLLING BODY DIAMETER OF MOTION ROLLING GUIDE DEVICE, AND MOTION ROLLING GUIDE DEVICE AND MOTION ROLLING GUIDE SYSTEM UTILIZING THE DETERMINING METHOD

(75) Inventors: Shigeo Shimizu, Kawasaki (JP); Tooru Takahashi, Tokyo-to (JP)

(73) Assignee: THK Co., Ltd., Tokyo-To (JP)

( * ) Notice: Subject to any disclaimer, the term of this patent is extended or adjusted under 35 U.S.C. 154(b) by 132 days.

(21) Appl. No.: 09/760,601

(22) Filed: Jan. 17, 2001

(65) Prior Publication Data

US 2001/0051009 A1 Dec. 13, 2001

(30) Foreign Application Priority Data

Jan. 18, 2000  (JP) .................... P2000-013891

(51) Int. Cl.$^7$ ............................... F16C 29/06
(52) U.S. Cl. ........................................ 384/45
(58) Field of Search ........................... 384/45, 43, 44; 464/168

(56) References Cited

U.S. PATENT DOCUMENTS 5,244,283 A * 9/1993 Morita .................. 384/44

OTHER PUBLICATIONS

Takahashi, T., et al., "The precision in linear motion body guide (LMBG) system—Influence of the diameter of rolling body," Proceeding of the 1999 JSPE Fall Conference, p. 590 (Fall, 1999).

* cited by examiner

Primary Examiner—Lenard A. Footland
(74) Attorney, Agent, or Firm—Armstrong, Westerman & Hattori, LLP

(57) ABSTRACT

A raceway surface length of a movable member and a diameter of a rolling body of a motion rolling guide device is determined such that, in a stroke of $2\kappa Da$ of the movable member at which relative positions of the movable member and the respective rolling bodies vary, a ratio (I:I−1) of a range in which number of effective rolling bodies is I and a range of number of effective rolling bodies is I−1 is about 100% to 0% (100%:0%), wherein I=int $(2Ux/\kappa Da+0.5)$, 2Ux: length of raceway surface of movable member and $\kappa Da$: rolling body pitch or retainer pitch.

6 Claims, 19 Drawing Sheets

$$\begin{pmatrix} \frac{\partial g_1}{\partial \alpha_1} & \frac{\partial g_1}{\partial \alpha_2} & \frac{\partial g_1}{\partial \alpha_3} & \frac{\partial g_1}{\partial \alpha_4} & \frac{\partial g_1}{\partial \alpha_5} \\ \frac{\partial g_2}{\partial \alpha_1} & \frac{\partial g_2}{\partial \alpha_2} & \frac{\partial g_2}{\partial \alpha_3} & \frac{\partial g_2}{\partial \alpha_4} & \frac{\partial g_2}{\partial \alpha_5} \\ \frac{\partial g_3}{\partial \alpha_1} & \frac{\partial g_3}{\partial \alpha_2} & \frac{\partial g_3}{\partial \alpha_3} & \frac{\partial g_3}{\partial \alpha_4} & \frac{\partial g_3}{\partial \alpha_5} \\ \frac{\partial g_4}{\partial \alpha_1} & \frac{\partial g_4}{\partial \alpha_2} & \frac{\partial g_4}{\partial \alpha_3} & \frac{\partial g_4}{\partial \alpha_4} & \frac{\partial g_4}{\partial \alpha_5} \\ \frac{\partial g_5}{\partial \alpha_1} & \frac{\partial g_5}{\partial \alpha_2} & \frac{\partial g_5}{\partial \alpha_3} & \frac{\partial g_5}{\partial \alpha_4} & \frac{\partial g_5}{\partial \alpha_5} \end{pmatrix} \begin{pmatrix} \varepsilon_1 \\ \varepsilon_2 \\ \varepsilon_3 \\ \varepsilon_4 \\ \varepsilon_5 \end{pmatrix} = \begin{pmatrix} g_1 \\ g_2 \\ g_3 \\ g_4 \\ g_5 \end{pmatrix} \quad \text{-----(1)}$$

$$rms = \frac{1}{5} \sqrt{\sum_{\ell=1}^{5} \varepsilon_\ell^2}$$

$rms \leq 10^{-10}$    $\alpha_\ell =$ solutions $\Rightarrow$ Finished $rms > 10^{-10}$    $\alpha_\ell = \alpha_\ell + \varepsilon_\ell$    $\Rightarrow$ to Equation (1)

F I G. 10

METHOD OF DETERMINING RACEWAY SURFACE LENGTH AND ROLLING BODY DIAMETER OF MOTION ROLLING GUIDE DEVICE, AND MOTION ROLLING GUIDE DEVICE AND MOTION ROLLING GUIDE SYSTEM UTILIZING THE DETERMINING METHOD

The present application claims priority under 35 U.S.C §119 to Japanese Patent Application No.2000-13891, filed Jan. 18, 2000 entitled "METHOD OF DETERMINING RACEWAY SURFACE LENGTH AND ROLLING BODY DIAMETER OF MOTION ROLLING GUIDE DEVICE, AND MOTION ROLLING GUIDE DEVICE AND MOTION ROLLING GUIDE SYSTEM UTILIZING THE DETERMINING METHOD." The contents of that application are incorporated herein by reference in their entirety.

BACKGROUND OF THE INVENTION

The present invention relates to a motion rolling guide device, and more particularly, to a method of determining a length of a raceway surface and a diameter of a rolling body of a motion rolling guide device, to a motion rolling guide device and to a motion rolling guide system utilizing such determining method.

There are known linear motion ball guide, ball bush, ball spline and the like as a motion rolling guide device for guiding a linear or curvilinear motion. In such motion rolling guide devices, the linear motion ball guide comprises a track shaft and a movable block as a movable member disposed to be movable with respect to the track shaft through a number of balls as rolling bodies. A linear motion ball guide system as a motion rolling guide system is a system in which the linear motion guide device is assembled with a table of a machine tool or the like and, for example, two movable blocks are assembled to two track shafts respectively for supporting the table with total four movable blocks.

In such system the table is applied a radial load, horizontal load, and respective moment loads of rolling load, yawing load and pitching load as external forces. The table changes its posture by virtue of these external forces, and the table posture includes five variable components of vertical (perpendicular) displacement, horizontal (transverse) displacement, rolling angle, yawing angle and pitching angle.

The movable block has a raceway surface, and a number of balls are disposed between this raceway surface and a track rail as a track shaft. In the linear motion ball guide, balls roll in accordance with the movement of the movable member and, therefore, a relative position of the balls and the movable block is variable. This variation of the relative position of the balls and the movable block causes a change of load distribution in the linear motion guide system, and hence, the posture of the table varies. The variable amount of the posture of the table represents the precision of the linear motion ball guide system, and accordingly, by lowering this variable amount of the table posture, the precision of the linear motion ball guide system can be improved.

SUMMARY OF THE INVENTION

In view of the circumstances in the prior art mentioned above, an object of the present invention is to provide a method of determining a length of a raceway surface of a movable member and a diameter of a rolling body of a rolling guide device, and a rolling guide device and a rolling guide system utilizing such determining method, which can reduce or lower the variable five components of an posture of a member to be moved, which represent a precision of a motion rolling guide system, particularly, in consideration of variable load distribution in accordance with the variation of the relative position of a movable member and a number of rolling bodies.

In the motion rolling guide device, the relative positions of the respective rolling bodies and the movable member are variable in accordance with the stroke, and when the stroke reaches to 2 κ Da (rolling body pitch or retainer pitch), one cycle is completed and, thereafter, this cycle is repeated. In the interval of this 2 κ Da stroke, since the relative positions of the rolling bodies vary, the load distribution in the motion rolling guide device varies and, hence, the posture of a table of the motion rolling guide system varies in accordance with the variation of this load distribution.

The inventors of the subject application analyzed the precision of a linear motion ball guide system by dividing the 2 κ Da stroke of the movable member and solving equations of equilibrium concerning the external loads and rolling body loads at respective positions to thereby obtain five variable components of the posture of the table. In such analysis, the deformation of a flange portion of the movable member has been considered to make it possible to analyze the precision in more actual manner.

According to the result of such analysis, it was found that as the diameter of the rolling body decreases, the radial displacement, the pitching and the maximum distribution load become smaller, but the radial displacement and the pitching angle variation representing the precision of the motion rolling guide system is not simply proportional to the diameter of the rolling body. That is, it was found that there exists any factor other than the diameter of the rolling body which gives an influence to such precision. As this factor, the inventors had paid their attentions to a ratio of the variation of the number of effective rolling bodies contributing the load in the 2 κ Da stroke and had found out that the variations of the radial displacement and pitching angle could be made extremely small by making this ratio a certain value to thereby remarkably enhance the precision of the linear motion guide system.

In consideration of the above matters, the objects of the present invention can be achieved by providing, in one aspect, a method of determining a raceway surface length of a movable member and a diameter of a rolling body of a motion rolling guide device which comprises a movable member and rolling bodies, wherein, in a stroke of 2 κ Da of the movable member at which relative positions of the movable member and the respective rolling bodies vary, a ratio (I:I−1) of a range in which the number of effective rolling bodies is I and a range in which the number of effective rolling bodies is I−1 is about 100% to 0% (100%:0%), wherein I=int(2Ux/κ Da+0.5), 2Ux: length of raceway surface of movable member and κ Da: rolling body pitch or retainer pitch.

According to the invention of this aspect, the change of the number of effective rolling bodies due to the stroke is reduced and the precision of the motion rolling guide system, particularly the pitching precision, can be remarkably improved. Moreover, when the change of the number of effective rolling bodies is reduced, influence given to the pitching precision by changing the diameter of the rolling body is also reduced, and for example, the diameter of the rolling body can be made large while maintaining the pitching precision, and the basic dynamic load rating can be also made large.

The above object can be also achieved by providing, in a further aspect, a motion rolling guide device comprising a movable member and rolling bodies, wherein a length of a raceway surface of the movable member and a diameter of the rolling body are determined such that, in a stroke of 2 κ Da of the movable member at which relative positions of the movable member and the respective rolling bodies vary, a ratio (I:I−1) of a range in which the number of effective rolling bodies is I and a range in which the number of effective rolling bodies is I−1 is about 100% to 0% (100%:0%), wherein I=int(2Ux/κ Da+0.5), 2Ux: length of raceway surface of movable member and κ Da: rolling body pitch or retainer pitch.

The above object can be also achieved by providing, in a still further aspect, a motion rolling guide system comprising a track rail, at least one movable member mounted to the track rail to be movable and rolling bodies disposed between the track rail and the movable member, wherein a length of a raceway surface of the movable member and a diameter of the rolling body are determined such that, in a stroke of 2 κ Da of the movable member at which relative positions of the movable member and the respective rolling bodies vary, a ratio (I:I−1) of a range in which the number of effective rolling bodies is I and a range in which the number of effective rolling bodies is I−1 is about 100% to 0% (100%/:0%), wherein I=int(2Ux/κ Da+0.5), 2Ux: length of raceway surface of movable member and κ Da: rolling body pitch or retainer pitch.

Furthermore, the inventors had also paid their attentions, as another factor, to the relative positions of the rolling bodies in the movable members disposed at forward and rearward positions in the same track shaft of the linear motion guide system and found out that the variation of the pitching angles can be remarkably reduced by adjusting the spans of the movable members so as to make the relative positions of the rolling bodies coincident with each other.

That is, the above object can be achieved according to the present invention by providing, in a still further aspect, a motion rolling guide system comprising a track means, a plurality of movable members mounted to the track means and number of rolling bodies disposed between the track means and the movable members, wherein spans of the movable members are adjusted so that relative positions of the rolling bodies in the respective movable members accord with each other. This adjustment is realized by making the span of the movable member integral multiples of the rolling body pitch 2 κ Da.

In a structure in which the guide system is provided with a plurality of track shafts, the span of the movable member may be adjusted so that the relative positions of the rolling bodies in the movable members mounted to the respective track shafts accord with each other.

Still furthermore, the present invention can provide the combination of the above two factors (aspects), that is, there is provided a motion rolling guide system, in which a plurality of movable members are mounted to the track means, wherein a length of a raceway surface of the movable member and a diameter of the rolling body are determined such that, in a stroke of 2 κ Da of the movable member at which relative positions of the movable member and the respective rolling bodies vary, a ratio (I:I−1) of a range in which the number of effective rolling bodies is I and a range in which the number of effective rolling bodies is I−1 is about 100% to 0% (100%:0%), wherein I=int(2Ux/κ Da+0.5), 2Ux: length of raceway surface of movable member and κ Da: rolling body pitch or retainer pitch.

According to such aspect, the above two effects or functions can be effectively combined and the precision of the motion rolling guide system can be further enhanced.

Still furthermore, the present invention can provide the combination of the above two factors (aspects), that is, there is provided a motion rolling guide system, in which a plurality of movable members are mounted to the track means, wherein a length of a raceway surface of the movable member and a diameter of the rolling body are determined such that, in a stroke of 2 κ Da of the movable member at which relative positions of the movable member and the respective rolling members vary, a ratio (I:I−1) of a range in which the number of effective rolling bodies is I and a range in which the number of effective rolling bodies is I−1 is about 50% to 50% (50%:50%), wherein I=int(2Ux/κ Da+0.5), 2Ux: length of raceway surface of movable member and κ Da: rolling body pitch or retainer pitch.

According to such aspect, the above two effects or functions can be also effectively combined and the precision of the motion rolling guide system can be further enhanced.

The further characteristic features of the present invention will be made more clear from the descriptions made with reference to the accompanying drawings.

BRIEF DESCRIPTION OF THE DRAWINGS

In the accompanying drawings:

FIG. 3 includes views showing setting conditions for analysis, in which FIG. 3A is a plan view of the linear motion ball guide of FIG. 2 and FIG. 3B is a side view thereof;

FIG. 6 includes views showing conditions of the number of effective balls, in which

FIG. 10 is a view showing a Newton-Raphson Method;

FIG. 11 includes graphs showing influences of stroke, in which FIG. 11A is a graph showing a displacement in a vertical direction, FIG. 11B is a graph showing a pitching angle and FIG. 11C is a graph showing a distribution load;

FIG. 12 includes graphs showing variation due to diameter of the ball, in which FIG. 12A is a graph showing a fluctuation of vertical direction, FIG. 12B is a graph showing a fluctuation of the pitching angle and FIG. 12C is a graph showing a fluctuation of the distribution load;

FIG. 13 includes graphs showing variation due to the diameter of the ball in a case where phases are made coincident with each other, in which FIG. 13A is a graph showing a fluctuation of vertical direction, FIG. 13B is a graph showing a fluctuation of the pitching angle and FIG. 13C is a graph showing a fluctuation of the distribution load;

FIG. 14 includes graphs showing variation due to the diameter of the ball in a case where phases are made coincident with each other, and a raceway surface length is made optional times of the ball pitch, in which FIG. 14A is a graph showing a fluctuation of vertical direction, FIG. 14B is a graph showing a fluctuation of the pitching angle and FIG. 14C is a graph showing a fluctuation of the distribution load;

FIG. 15 includes graphs showing variation due to the ball diameter under each of the conditions, in which FIG. 15A is a graph showing a fluctuation of vertical direction, FIG. 15B is a graph showing a fluctuation of the pitching angle and FIG. 15C is a graph showing a fluctuation of the distribution load;

FIG. 17 includes graphs showing variation due to the diameter of the ball in a case where phases of movable blocks are made coincident with each other, and a raceway surface length is made optional times of the ball pitch, in which FIG. 17A is a graph showing a fluctuation of vertical direction, FIG. 17B is a graph showing a fluctuation of the pitching angle and FIG. 17C is a graph showing a fluctuation of the distribution load;

FIG. 18 includes graphs showing comparison in variations due to the ball diameter under each of the conditions, in which FIG. 18A is a graph showing a fluctuation of vertical direction, FIG. 18B is a graph showing a fluctuation of the pitching angle and FIG. 18C is a graph showing a fluctuation of the distribution load.

DESCRIPTION OF THE PREFERRED EMBODIMENTS

The present invention will be described hereunder with reference to the accompanying drawings.

Figure 1:
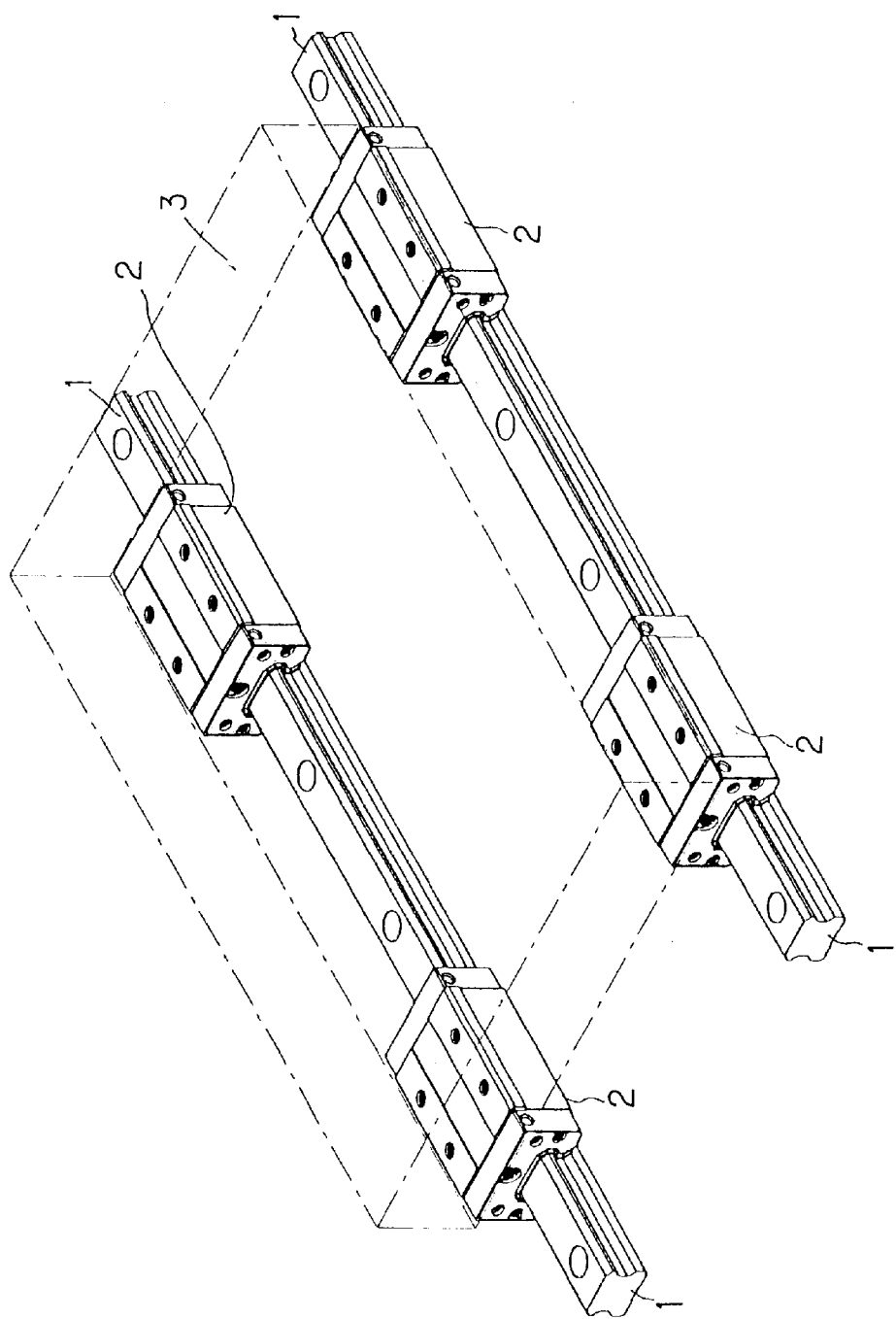
FIG. 1 is a perspective view showing a linear motion ball guide system as a motion rolling guide system according to the present invention.

FIG. 1 shows a linear motion ball guide system as a motion rolling guide system being an object to be analyzed by the present invention, and such linear motion ball guide system is used under conditions of various heavy loads, moment loads and the like in machine tools, transportation tools, industrial robots and the like.

The linear motion ball guide system shown in FIG. 1 comprises two track rails 1 as track shafts arranged in parallel to each other and four movable blocks 2 (two for each track rail) as movable member assembled with the track rails 1 and support a table 3 to be linearly movable.

Figure 2:
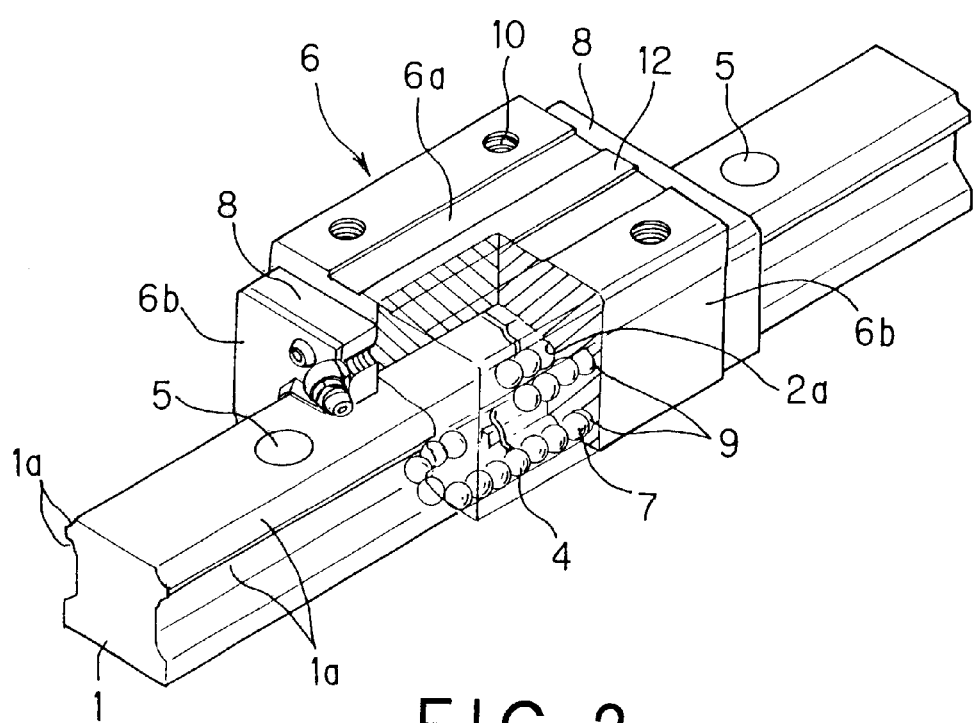
FIG. 2 is a perspective view showing a linear motion ball guide of the system of FIG. 1.

FIG. 2 shows a linear motion ball guide to be assembled with the linear motion guide system of FIG. 1 as a motion rolling guide device. This linear motion ball guide comprises a track rail 1 disposed on a fixed member (portion) and formed with a ball rolling groove 1a as rolling body rolling surface formed along a longitudinal direction of the rail; a movable block 2 formed with a ball circulation passage 7 including a loaded rolling groove 2a as a loaded rolling surface corresponding to the ball rolling groove 1a of the track rail 1 and assembled to the track rail 1 to be relatively movable thereto; and a number of balls 4 as rolling bodies which are accommodated in the ball circulation passage 7 and circulate therein in accordance with the relative motion of the movable block with respect to the track rail 1.

The track rail 1 has a long and narrow structure and has substantially a rectangular shape in cross section. The ball rolling grooves 1a are formed, as tracks for the rolling balls 4, to both the lateral side surfaces of the track rail 1 so as to extend entirely along the longitudinal direction thereof. Further, although two rows of the ball rolling grooves 1a are formed to each of the side surfaces of the track rail 1, the number and the arrangement of the grooves 1a can be changed variously in accordance with objects or conditions for use. The track rail 1 is formed with screw holes 5 for mounting the rail 1 to the fixed portion. A curved rail may be used in place of the shown linear track rail 1.

The movable block 2 is composed of a block body 12 and a pair of end plates 8 disposed at both longitudinal ends of the block body 12 so as to be assembled therewith. The end plate 8 is formed with a direction changing passage, and hence, it may be called as direction changing passage forming member. The block body 12 is a block member, having a ⊐-shaped section, and having, in an assembled state, a horizontal portion 6a opposing to the upper surface of the track rail 1 and a pair of support legs 6b having inner surfaces opposing to the side surfaces of the track rail 1. Each of the support legs 6b is formed, at its inside surfaces, with two rows of loaded rolling grooves 2a opposing to ball rolling grooves 1a formed to the track rail 1. Furthermore, each of the support legs 6b is formed with two ball return passages 9 in shape of tunnel extending in parallel to the ball rolling grooves 1a. The block body 12 is also formed with screw holes 10 for securing the table 3 to the upper surface of the block body 12 by means of screws or the like.

According to the movement of the movable block 6 along the track rail 1, the balls 4 roll and move along the loaded rolling passage with a load being applied from the movable block 6, and when the balls 4 roll to one end of the loaded rolling passage, the balls 4 are scooped up and guided to the return passage 9 through the direction changing passage, and thereafter, returned to the one end of the loaded rolling passage through the other direction changing passage.

The traveling (running) performance of the linear motion ball system will be analyzed hereunder in the assumption that a linear motion ball guide system is assembled to a table of a machine tool or the like, and in consideration of a deformation of a flanged portion of the movable block, an equation of equilibrium concerning a load distribution state in the linear motion ball guide system is introduced to thereby make clear the relationship between a diameter of the ball housed in the linear motion ball guide and a traveling performance in view of influences on rigidity and lifetime of the ball guide.

Figure 3:
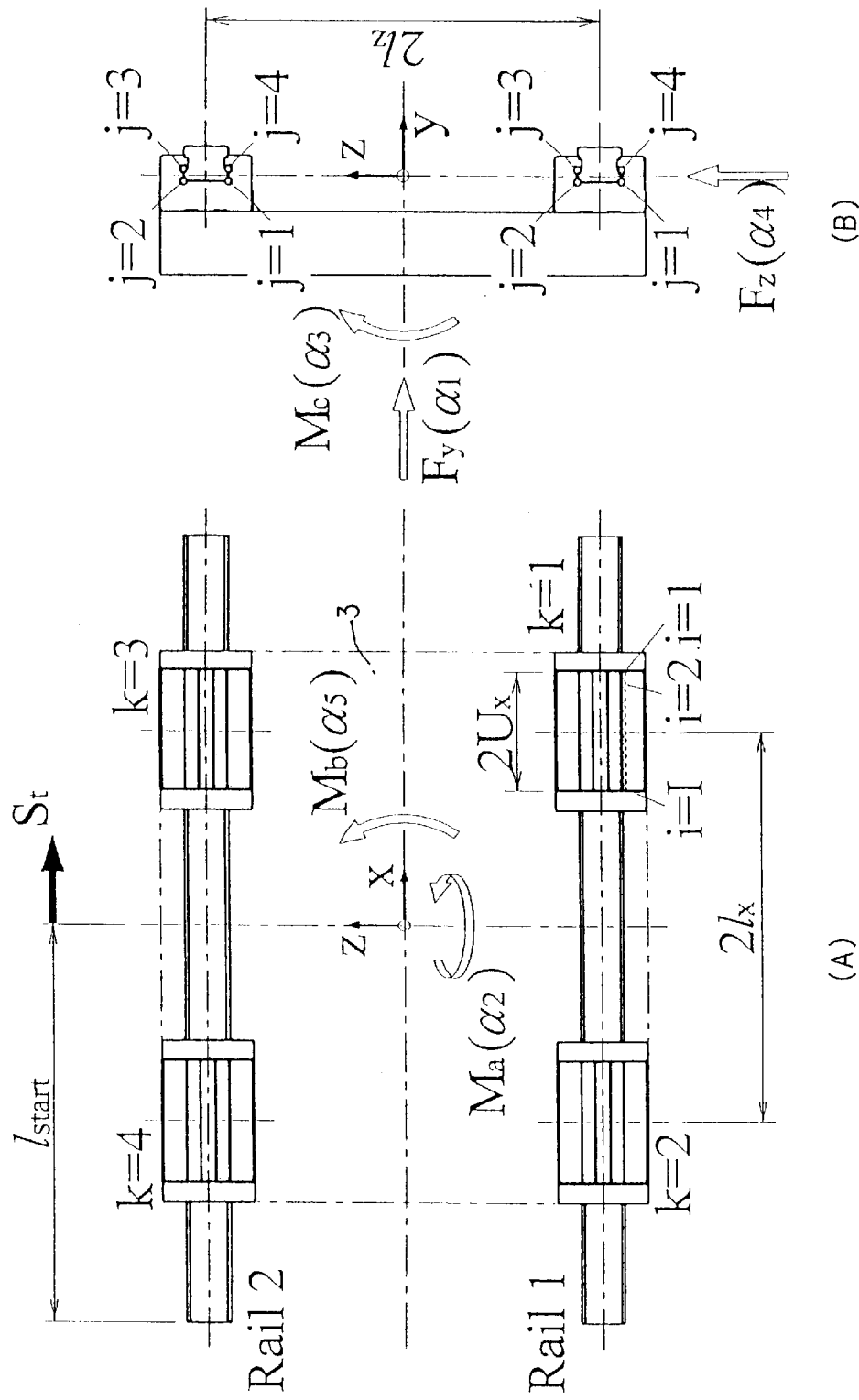

FIG. 3 represents setting conditions for analysis, and an object to be analyzed is an X-table (single axis) in which four movable blocks are supported by two rails. FIG. 3 includes FIG. 3A being a plan view and FIG. 3B being a side view.

With reference to FIG. 3:

Setting of axis of coordinates: X-axis and Z-axis are set on the table 3 and a Y-axis is set to be a direction normal to the surface of the table 3.

Setting of external force: a radial load applied to the table 3 is set as Fy; a horizontal (transverse) load applied thereto is set as Fz; a rolling moment about the X-axis is set as Mc; a yawing moment about the Y-axis is set as Mb, and a pitching moment about the Z-axis is set as Ma. These external forces act, as static equivalent amount, on the origin of coordinates below the central portion of the table 3.

Setting of displacement: a radial displacement of the table is set as $\alpha 1$; a horizontal displacement thereof is set as $\alpha 4$; a rolling angle is set as $\alpha 3$; a yawing angle is set as $\alpha 5$; and a pitching angle is set as $\alpha 2$.

Setting of table position: a distance between the end portion of the track rail 1 to the center of the table is set as 1start.

Furthermore, references of k1, k2, k3 and k4 are added to the four movable blocks, respectively, and mounting pitches of the movable block are set as $2lx$ in the X direction and $2lz$ in the Y direction. References of $i=1$, $i=2$, - - - $i=I$ are added to the respective balls 4 of the linear motion ball guide, and references of $j=1$, $j=2$, $j=3$ and $j=4$ are added to the four loaded rolling passages in which the balls are arranged.

Figure 4:
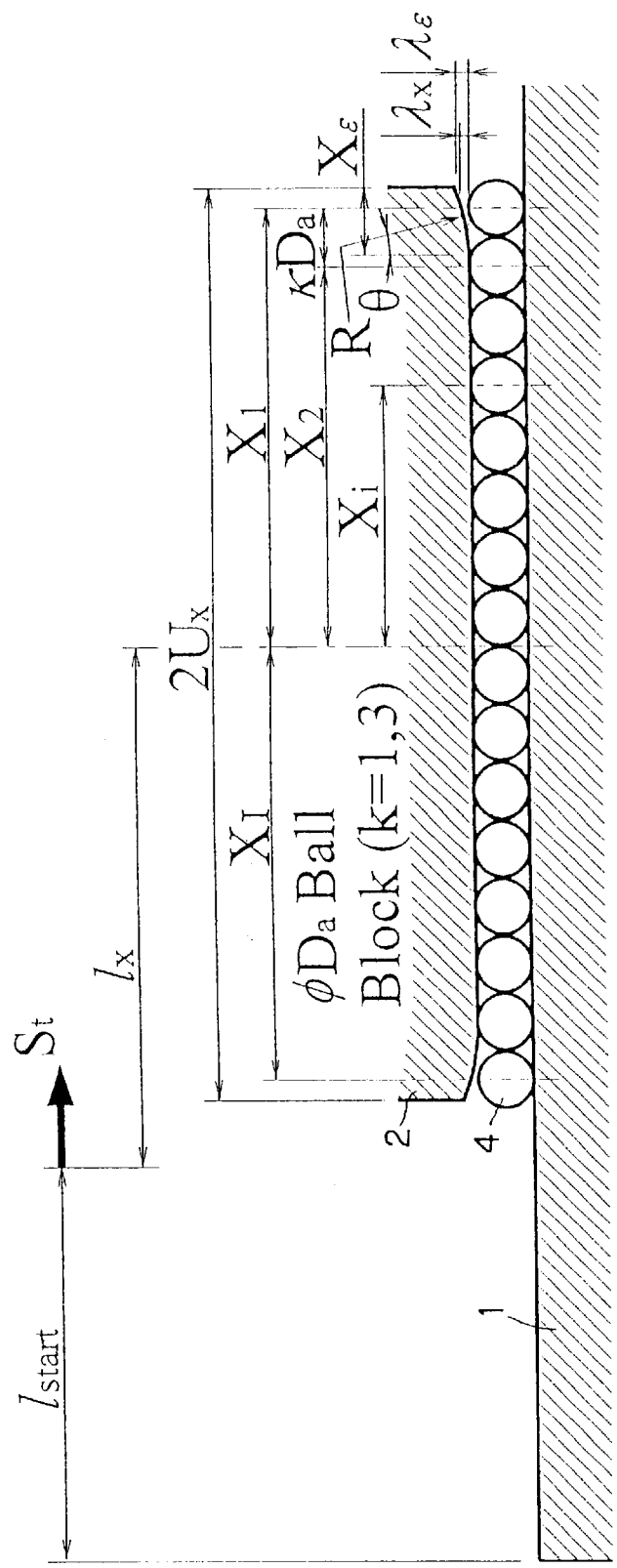
FIG. 4 is an illustration of a longitudinal sectional view of a movable block.

FIG. 4 shows a longitudinal sectional view of a certain one movable block 2 in a certain state. Since a large magnitude of Hertz stress develops on the two end of the raceway surface of the movable block 2 with either no crowning or a small crowning, when the balls are passing through the passage and then to the exit, crowning has to be provided in order to ease this situation. In the illustrated case, a circular R-crowning treatment is made to both end portions of the movable block 2. This crowning is made in a distance from the end surface of the guide block to a position $X\epsilon$ with a shape represented by an expression of $x=R(1-\cos\theta)$. Further, since the movable block is inserted from the end surface of the track rail 1, the relative position of the movable block 2 and the ball(s) 4 will be determined, in theory, by a distance from the rail end surface.

Figure 5:
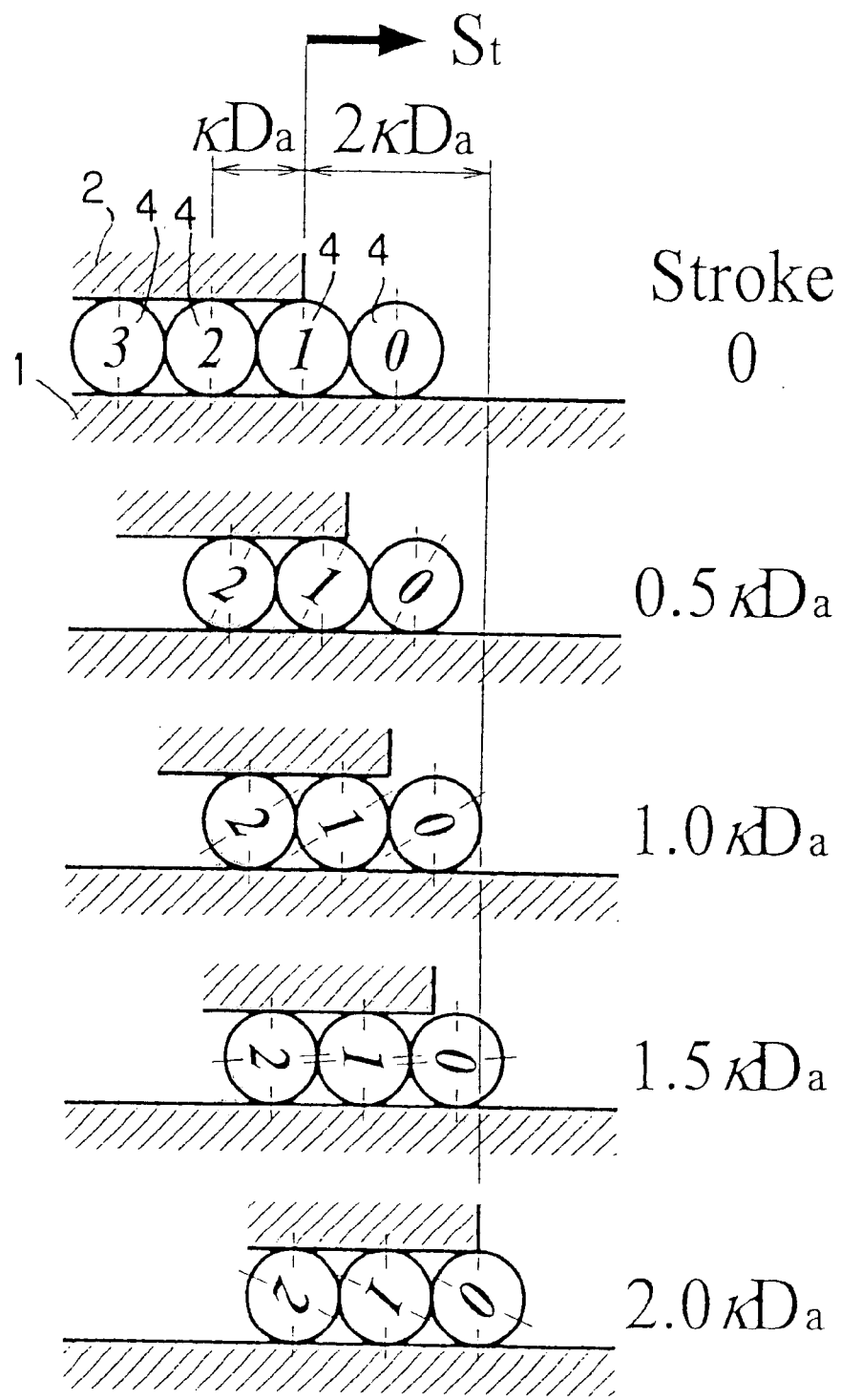
FIG. 5 is a view showing a relationship between a stroke and a ball position.

FIG. 5 represents a relationship between the stroke of the movable block 2 and the ball position. When the movable block 2 moves, the balls 4 roll, and the relative position of the movable block 2 to the balls 4 are changed. In the illustrated example, when the stroke of the movable block 2 is changed as $0 \to 0.5\,\kappa\,Da \to 1.0\,\kappa\,Da \to 1.5\,\kappa\,Da \to 2.0\,\kappa\,Da$, the relative position of the movable block 2 to the balls 4 are changed as shown in FIG. 5. Providing that the ball pitch is $\kappa\,Da$, when the movable block 2 is moved by $2\,\kappa\,Da$, it takes an original state, which is equal to the relative positional state of the movable block 2 and the balls 4 in the case of the stroke "0". That is, the relative position of the movable block 2 and the balls 4 changes with $2\,\kappa\,Da$ stroke of the movable block 2 being one cycle, and this cycle is repeated thereafter.

Herein, it is to be noted that the term "$\kappa$" of the $\kappa\,Da$ is a coefficient and the term "Da" denotes a ball diameter. The coefficient "$\kappa$" is determined univocally for a motion rolling guide device provided with a retainer, but providing that "1" is taken as this coefficient with respect to the whole ball guide element having no retainer, an unknown coefficient has to be again adopted because of generation of friction between the balls in the loaded area. The distribution of the coefficient "$\kappa$" is obtained through experiment by using a ball passing sensor or the like and determined in the following manner.

Figure 6A:
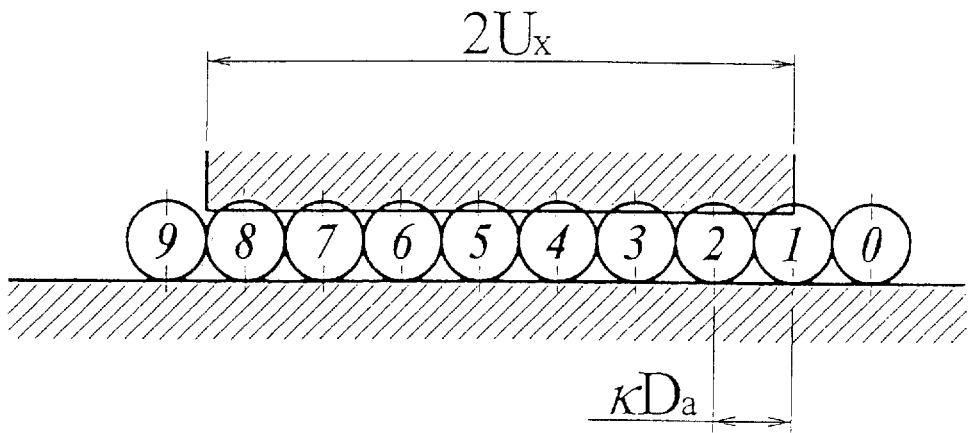
FIG. 6A shows the number of effective balls on design and FIG. 6B shows the actual number of effective balls.
Figure 6B:
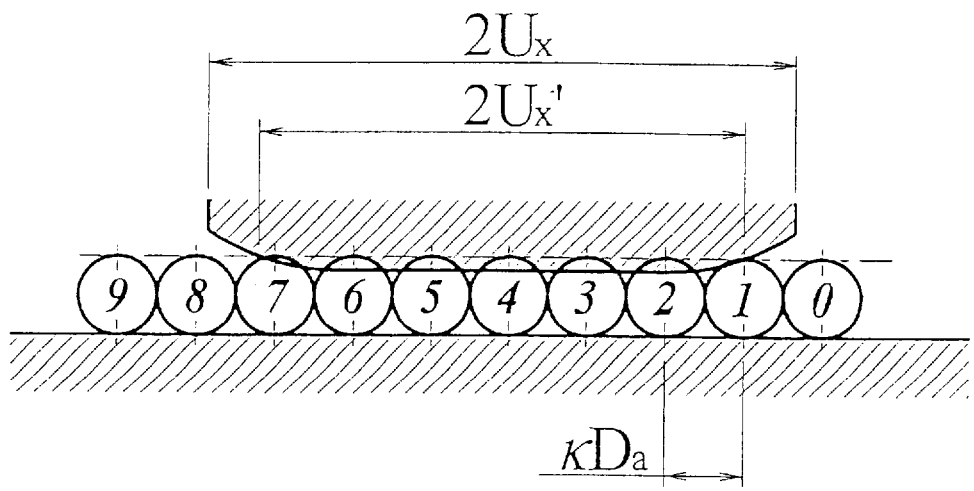

Rolling guide element with a retainer:
$\kappa\,Da$=retainer pitch
Rolling guide element with no retainer:
$\kappa\,Da=(1.000–1.005)Da$ FIG. 6 shows conditions of the number of effective balls, which are balls contacting the raceway surface and contributing to a load application. The number of effective balls is obtained by dividing the track surface length $2Ux$ by the ball pitch $\kappa\,Da$ and then rounding (half-adjust) off it. FIG. 6A shows a state of the number of effective balls, which has been considered by a designer, and the influence of the crowning is not considered. The number of effective balls on design is $I=\text{int}(2Ux/\kappa\,Da+0.5)$, in which "int" is a function for omitting the figure below the first decimal place, $2Ux$ is a raceway surface length of movable block, and $\kappa\,Da$ is a pitch of the rolling body or retainer, and in this case, since 0.5 is added to $2Ux/\kappa\,Da$, it is said that the $2Ux/\kappa\,Da$ is rounded off (half-adjusted). FIG. 6B shows an actual state, in which from the relationship between the crowning shape and the elastic deformation of the loaded balls, the effective length of the ball contact portion is $2Ux'$ which is shorter than the raceway surface length of the movable block $2Ux$. The actual number of effective balls is expressed by $I=\text{int}(2Ux'/\kappa\,Da+0.5)$, in which $2Ux'$ is a raceway surface length of the movable block, and $\kappa\,Da$ is a pitch of the rolling body or retainer, and the number of the effective balls in the stroke of $2\,\kappa\,Da$ changes as I and I–1, and I' and I'–1, for example.

Figure 7:
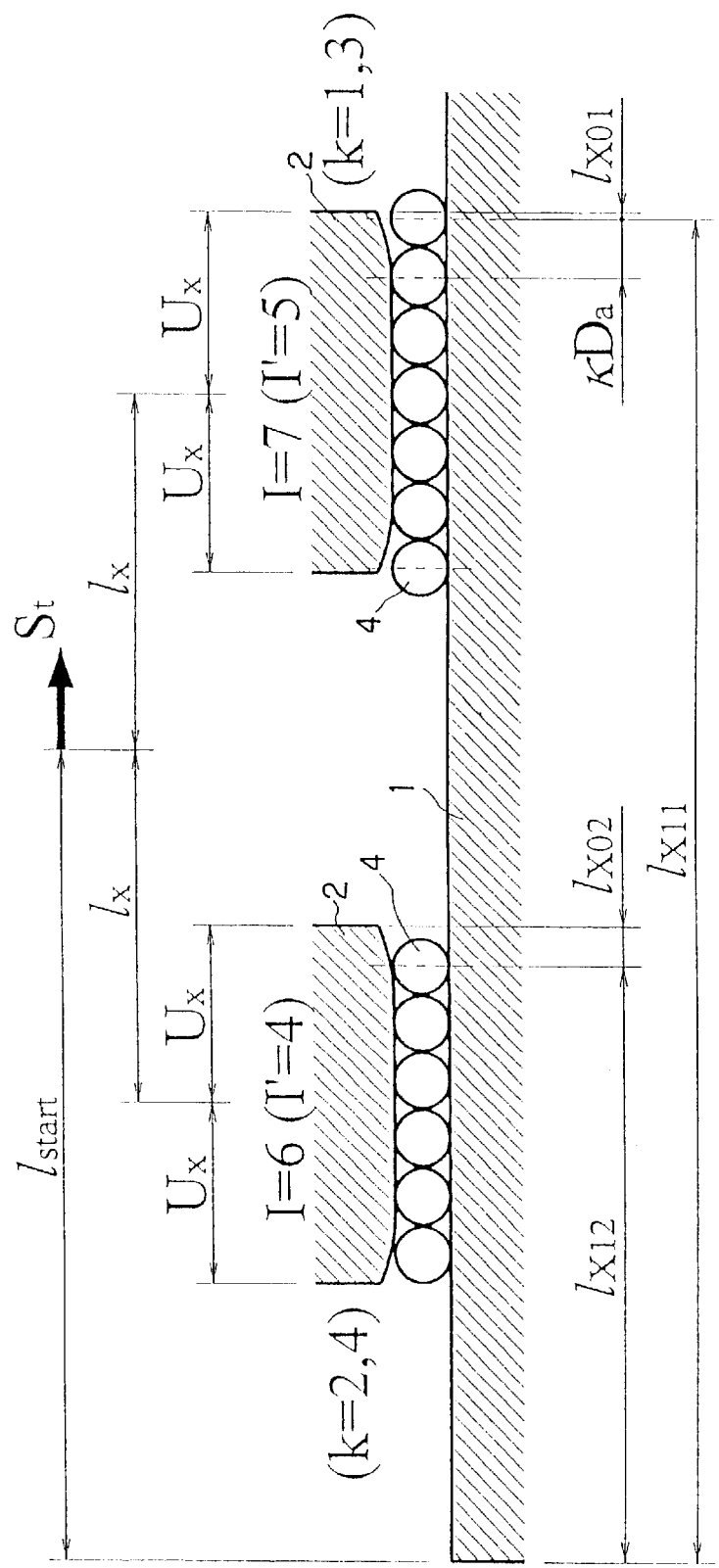
FIG. 7 is a view showing positional relationship among the track rail, the movable block and the balls.

FIG. 7 represents a relative relationship among the track rail 1, the movable block 2 and the balls 4. A user determines a block span of a plurality of movable blocks 2 mounted on the single shaft. In general, the relative positions of the movable blocks 2 and the balls 4 differ in accordance with the respective movable blocks 2. That is, as shown in FIG. 7, in different movable blocks 2, the distance $1x01$ between one end surface of one movable block 2 (right side one as viewed) and the first ball 4 and the distance $1x02$ between one end surface of another movable block 2 (left side one as viewed) differs from each other. Furthermore, the load varies, and accordingly, under a certain condition of load, the number of effective balls 4 in design and the actual ones are different for the respective movable blocks 2.

Figure 8:
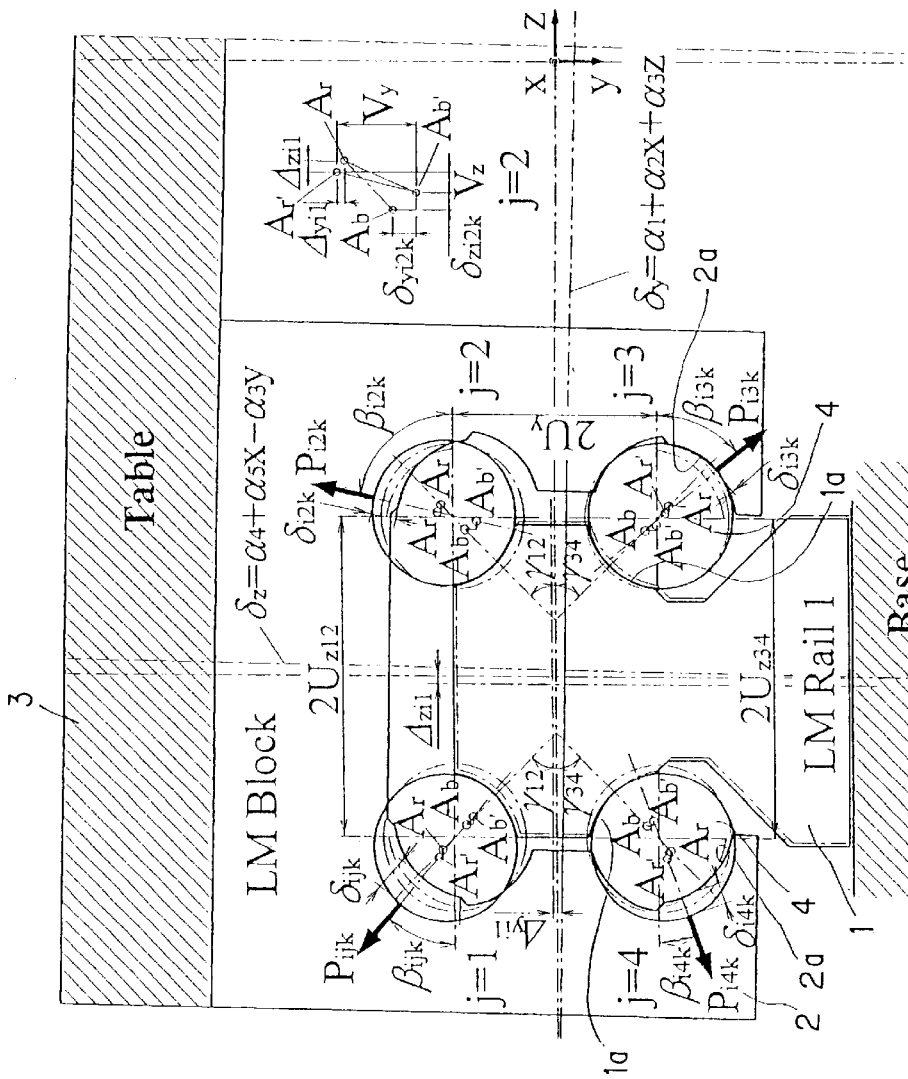
FIG. 8 is a view showing a distribution of load.

FIG. 8 shows the load distributions in the respective movable blocks 2. The load balance in each of the movable blocks 2 varies from moment to moment in accordance with the positional change of the balls 4 in each of the movable blocks 2. That is, the conditions of the load distributions in the respective movable blocks 2 at a time when the table 3 is moved in five component directions of displacement caused at a certain moment. With reference to FIG. 8, a symbol Ab denotes a center of curvature of the loaded rolling groove $2a$ of the movable block 2 and a symbol Ab' denotes a position of Ab after the movement. Symbols $\delta y i2k$ and $\delta z i2k$ show components in Y and Z directions of the movement amount of the center of curvature Ab. FIG. 8 shows the state considering a case of misalignment, and a symbol Ar shows a center of curvature of the ball rolling groove $1a$ of the rail 1. A symbol Ar' is a position of the Ar after the movement. Symbols $\Delta y i1$ and $\Delta z i1$ show components in Y and Z directions of the movement amount of the center of curvature Ar. A symbol Vy shows a length in Y direction of a line connecting the positions Ab' and Ar', and a symbol Vz shows a length in Z direction of a line connecting the positions Ab' and Ar'. Furthermore, a symbol Pijk shows a load of the rolling body according to the displacement, which acts in the direction of this line connecting the positions Ab' and Ar'. An angle $\beta ijk$ is an angle constituted by the direction of the load Pijk and the horizontal plane.

Further, the character "i" is the number of the rolling body on the raceway surface, the character "j" is the row number of the rolling body, and the character "k" is the number of the guide block.

Figure 9:
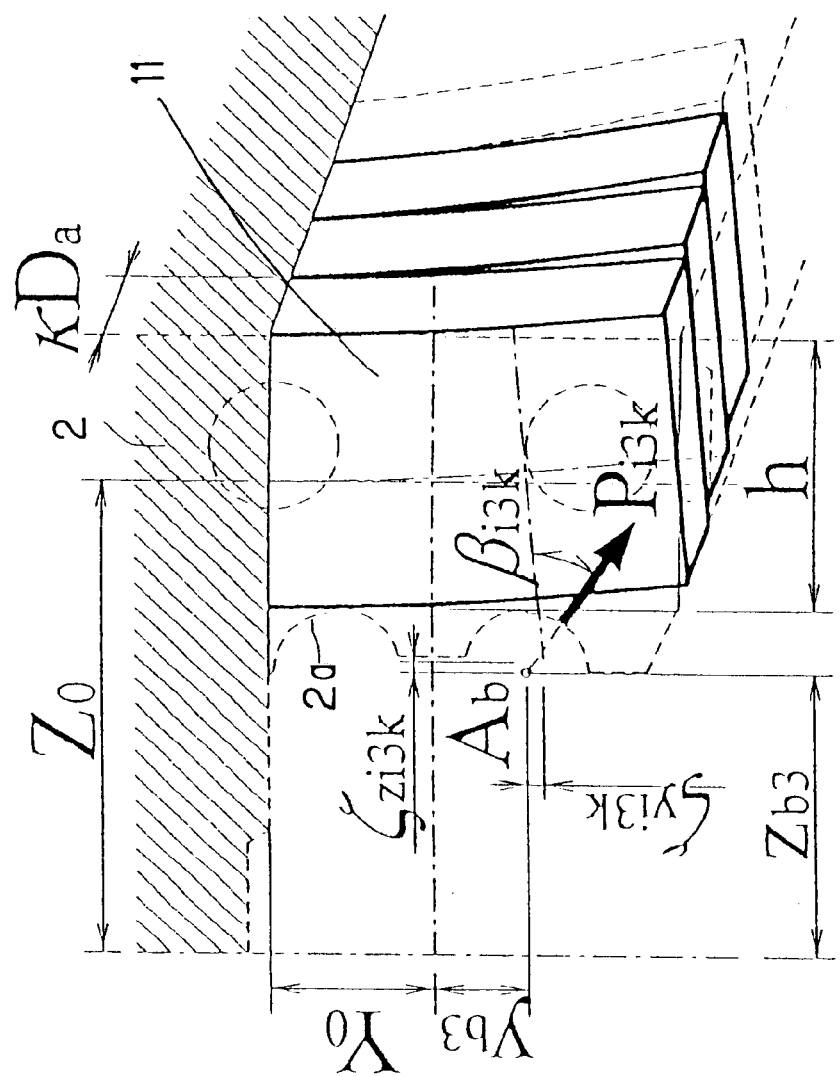
FIG. 9 is a view explaining an application of a beam theory of a block flange portion.

FIG. 9 shows a deformed state of the block flange portion (flange) 11 and a beam theory is applicable to the deformation of the block flange 11. A rectangular beam model is prepared by cutting the block flange 11 so as to have a thickness of the ball diameter and taking out the minimum portion of the thickness of a deformed flange. And a beam deformation is obtained by using the distribution load (N=1) obtained beforehand. Then, the movement amount of the center Ab' of groove curvature due to this beam deformation is again obtained, and the load distribution at this moved center Ab' of the groove curvature is again calculated (N=2). In this case, when the difference of the sum of the distribution loads of all the balls is larger than 0.001 in the cases of N=1 and N=2, the beam deformation is again obtained and procedures mentioned above will be repeated. A condition of convergence of this solution will be expressed by the following expression.

EXPRESSION 1

Condition of Convergence of Solution $$\sum_{k=1}^{4}\sum_{j=1}^{4}\sum_{i=1}^{I} P_{ijk}(N) - \sum_{k=1}^{4}\sum_{j=1}^{4}\sum_{i=1}^{I} P_{ijk}(N-1) < 10^{-3}$$

The traveling performance of the table 3 of all the strokes can be analyzed by repeating the above series of calculations at the position at which the stroke is subdivided.

Hereunder, a relational expression of the load distribution theory will be explained, and herein, the relational expression is obtained by using the five components of variation. First, the following calculation expression will be established as a basic expression from the above five components of variation.

EXPRESSION 2 y-directional displacement $\alpha_y = \alpha_1 + \alpha_2 X + \alpha_3 Z$ z-directional displacement $\alpha_z = \alpha_4 + \alpha_5 X - \alpha_3 y$ Hertz elastic contact theory (Hertzs law) is applied to the elastic deformation of the balls. The distribution load Pijk, the elastic displacement δijk and the contact angle βijk will be expressed as follows with the Hertz constant being shown as Cb.

EXPRESSION 3

$P_{ijk} = C_b \delta_{ijk}^{3/2}$ $\delta_{ijk} = \sqrt{V_y^2 + V_z^2} - (2f-1)D_a + \lambda - \lambda_x$ $$\tan\beta_{ijk} = \frac{V_y}{V_z}$$

According to these expressions, the following five conditional expressions for the balance of the force and the moment will be established.

EXPRESSION 4

For vertical displacement:

$$g_1 = \sum_{k=1}^{4}\sum_{j=1}^{4}\sum_{i=1}^{I} P_{ijk}\sin\beta_{ijk} - F_y = 0$$

For pitching angle:

$$g_2 = \sum_{k=1}^{4}\sum_{j=1}^{4}\sum_{i=1}^{I} P_{ijk}\sin\beta_{ijk} x_{ijk} - M_a = 0$$

For rolling angle:

$$g_3 = \sum_{k=1}^{4}\sum_{j=1}^{4} f_{jk} \sum_{i=1}^{I} P_{ijk}(z_{rijk}\sin\beta_{ijk} - y_{rijk}\cos\beta_{ijk}) - M_c = 0$$

fjk takes f1k=f2k=1, f3k=f4k=−1 with respect to the track rail 1 and also takes f1k=f2k=−1, f3k=f4k=1 with respect to the track rail 2.

For horizontal displacement:

$$g_4 = \sum_{k=1}^{4}\sum_{j=1}^{4}\sum_{i=1}^{I} P_{ijk}\cos\beta_{ijk} - F_z = 0$$

For yawing angle:

$$g_5 = \sum_{k=1}^{4}\sum_{j=1}^{4}\sum_{i=1}^{I} P_{ijk}\cos\beta_{ijk} x_{ijk} - M_b = 0$$

The five components of variation are obtained by solving the above simultaneous equation, and the solution is obtained by the Newton-Raphson method, which is represented by FIG. 10.

The result of the analysis will be described hereunder.

Figure 11:
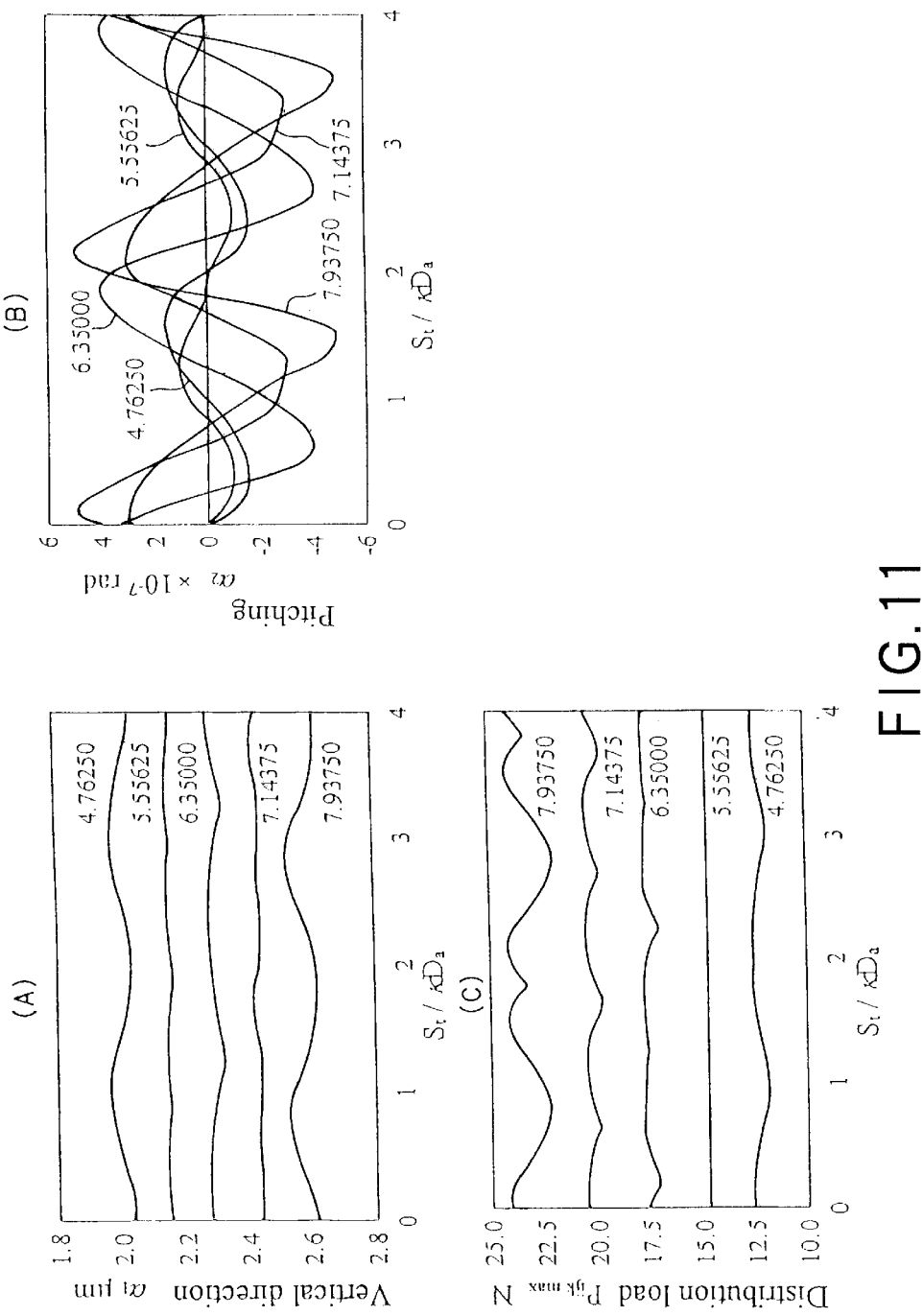

FIG. 11 shows an analysis result No. 1 "influence by stroke", in which FIG. 11A is a graph showing a displacement α1 in the vertical direction in the stroke 4 κ Da, FIG. 11B is a graph showing the pitching angle α2 and FIG. 11C is a graph showing the maximum distribution load Pijkmax per one ball. Furthermore, as fixed conditions, a crowning shape, a rail span, a radial load and a preload amount (λ=0) are set as follows.

$$2l_z = 250 \text{ mm} \quad \text{"R" crowning shape} \quad \text{[Expression 5]}$$
$$F_y = 1000 \text{ N} \quad X_\varepsilon = 1.5 \times D_a \text{ mm}$$
$$\lambda = 0 \quad \lambda_\varepsilon = \frac{D_a}{500} \text{ mm}$$

Furthermore, as variable conditions, a block length and a block span are set to the following conditions.

EXPRESSION 6

2Ux=80.4 mm

2lx=250 mm

Five kinds of balls having five kinds of diameters were utilized, in which the balls each having a diameter of 6.35000 mm were used as basic one (reference) and other four kinds of balls having two kinds of diameters larger than that of the basic one and two kinds of diameters smaller than that of the basic one, prescribed by JIS (Japan Industrial Standard), were utilized (i.e. five kinds of balls were utilized). As shown in FIG. 11, as the ball diameters decrease, the radial displacement, the pitching angle and the maximum distribution load also tend to decrease. However, the balls each having a diameter of 5.55625 mm provided good values of fluctuation of the pitching angle, the displacement in the vertical direction (radial displacement) and the variation of the maximum distribution load rather than those of the balls each having the smallest diameter of 4.76250 mm. The reason of this result will be considered to reside in whether these performances are simply proportional to the ball diameters or other factors affecting on such result exist.

Figure 12:
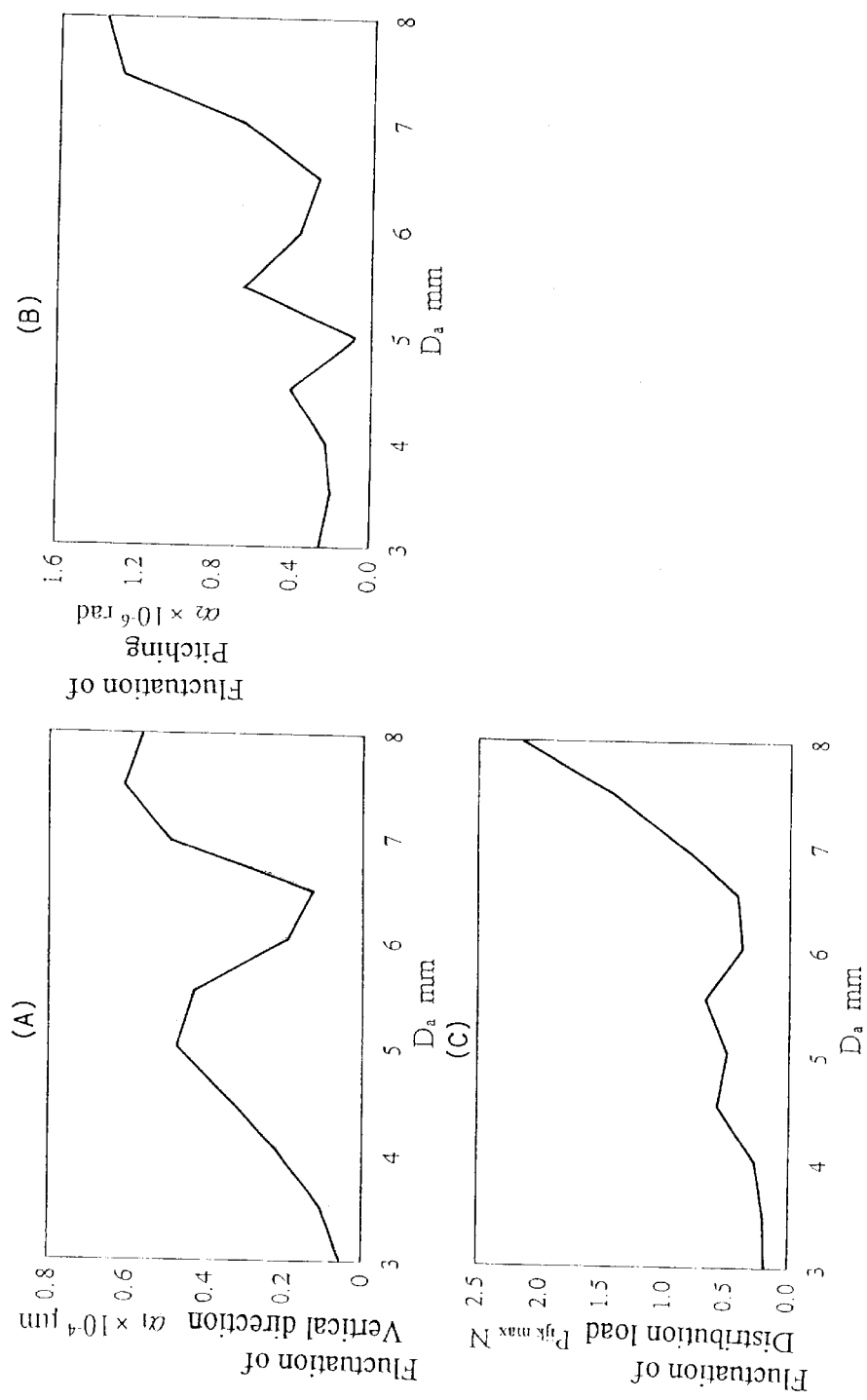

FIG. 12 shows the graph representing an analysis result No. 2 "fluctuation due to ball diameter", in which axis of abscissa shows the ball diameter and axis of ordinate shows fluctuations of the respective values. From this graph, it will be also understood that these values are not simply proportional to the ball diameters and shows some unnatural relationship. From this matter, it is considered that the difference in the relative positions in the balls 4 in the movable blocks 2 disposed at forward and rearward positions in the longitudinal direction of the rail 1 set in the former setting process constitutes the factor giving the influence.

Figure 13:
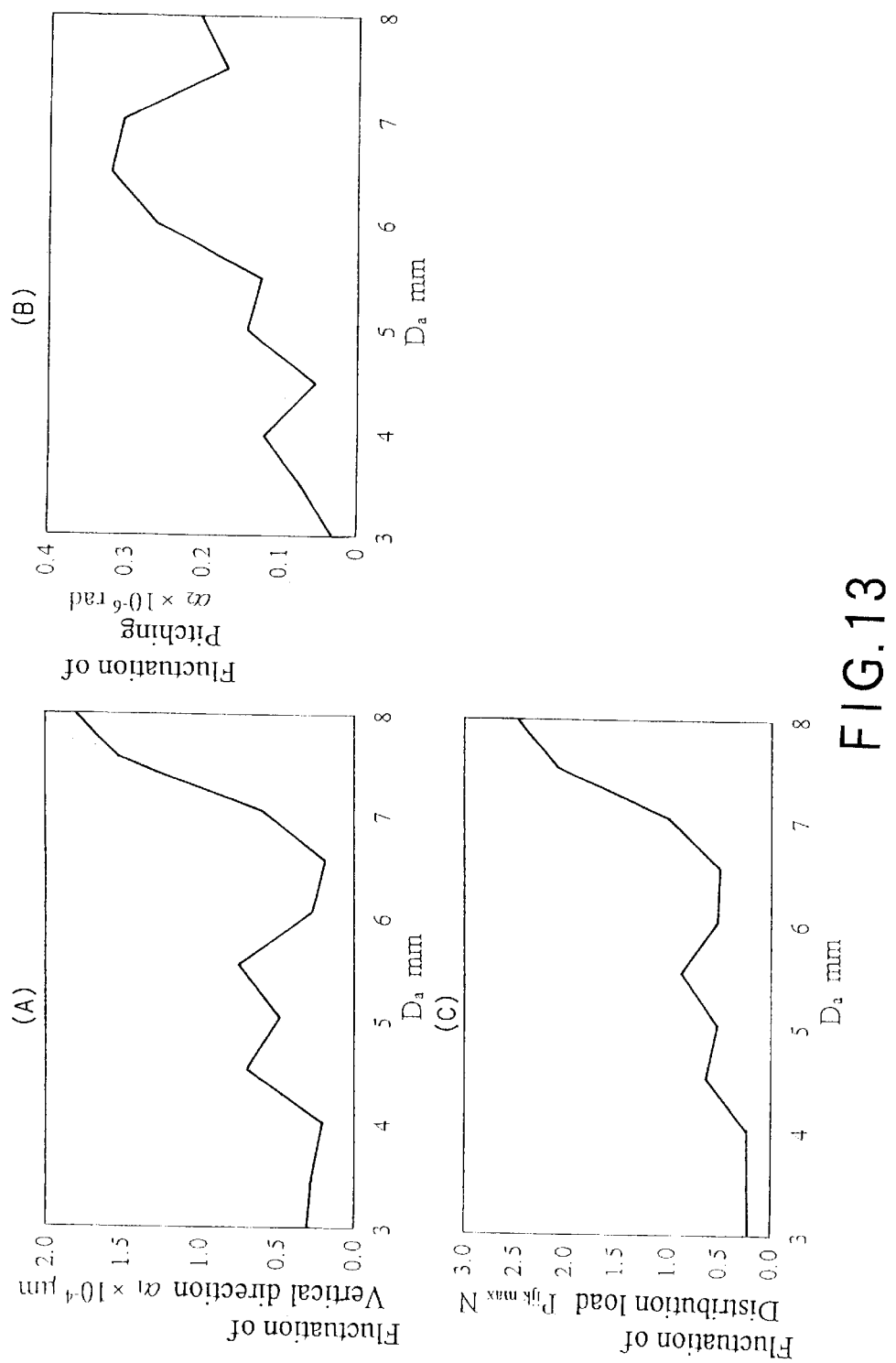

FIG. 13 shows the graph representing an analysis result No. 3 "fluctuation due to ball diameter in the case of phases of movable blocks being made coincident", in which the block spans are adjusted so as to make coincident the relative position of the balls 4 in the movable blocks disposed at the longitudinally forward and rearward positions thereof. The coincidence of the relative positions of the balls 4 in the movable blocks 2 with each other is achieved by making $Lx01=Lx02$ as shown in FIG. 7. Since the movable block 2 is mounted to the track rail 1 from the end portion thereof, the relative positions of the balls 4 in the movable blocks can be made coincident with each other by making the block span $2Lx$ integral multiples of $2\kappa Da$. The block span $2Lx$ is set to a value near the former set value of 250 mm. That is, variable block span is set to the following conditions.

EXPRESSION 7

$2Ux=80.4$ mm
$2Lx=n1\times 2\kappa Da$ mm (n1: integer)
$\therefore Lx01:=Lx02$
n1 is a value in which $2Lx$ approaches 250 mm.

As shown in FIG. 13, by making coincident the relative positions of the balls 4 in the forward (front) and rearward (rear) movable blocks 2, the fluctuation of the pitching angle becomes extremely less (see the scale of axis of ordinate). However, the magnitude of the fluctuation is not merely proportional to the ball diameter, and it seems that another factor still exist.

One of other factors which will be considered to exist is a ratio of variation of the number of effective balls in the $2\kappa Da$ stroke. The ratio of the variation of the number of the effective balls is of course made different by changing the ball diameters in accordance with the fixed raceway surface length. Accordingly, if this matter is unified, it seems that a more clear relationship will appear.

Figure 14:
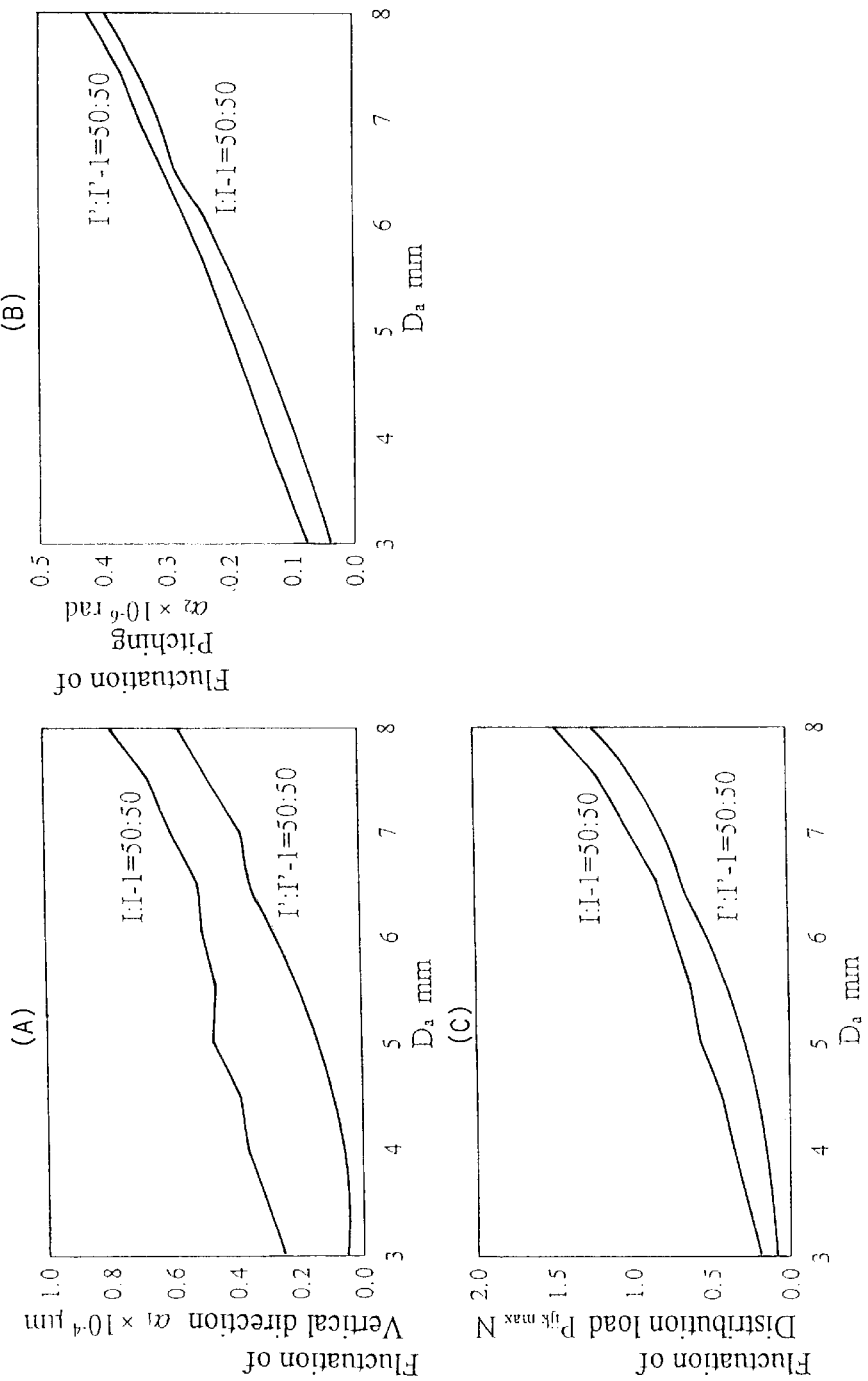

FIG. 14 shows the graph representing an analysis result No. 4 "fluctuation due to ball diameter", in which, as mentioned above, the block spans are adjusted so as to make coincident the relative positions of the balls 4 in the forward and rearward movable blocks with each other. Furthermore, the raceway surface length and the ball diameter are determined so that the ratio of a range in which the number of effective balls becomes I and a range of the number thereof becomes I−1, in the $2\kappa Da$ stroke of the movable block at which the relative position of the respective balls 4 and the movable blocks 2 varies, is 50%:50%. This is determined in both the number of effective balls in design and the actual number thereof. That is, variable conditions are set to the following values.

EXPRESSION 8

$2Ux=ni\times\kappa Da$ mm (ni: optional)
$2Lx=n1\times 2\kappa Da$ mm (n1: integer)
$\therefore Lx01:=Lx02$
ni is a value in which $2Ux$ approaches 80.4 mm.
n1 is a value in which $2Lx$ approaches 250 mm.

The ni is a value such that the number of effective balls in design becomes I:I−1=50:50 and the actual number of effective balls becomes I':I'−1=50:50 in the stroke of $2\kappa Da$.

As shown in FIG. 14, in which the ball diameter and the fluctuations of the respective values provide substantially the proportional relationship. From this matter, it will be concluded that the phases of the balls and the ratio of the number of effective balls in the forward and rearward movable blocks is the factor disturbing the proportional relationship of the ball diameter.

Figure 15:
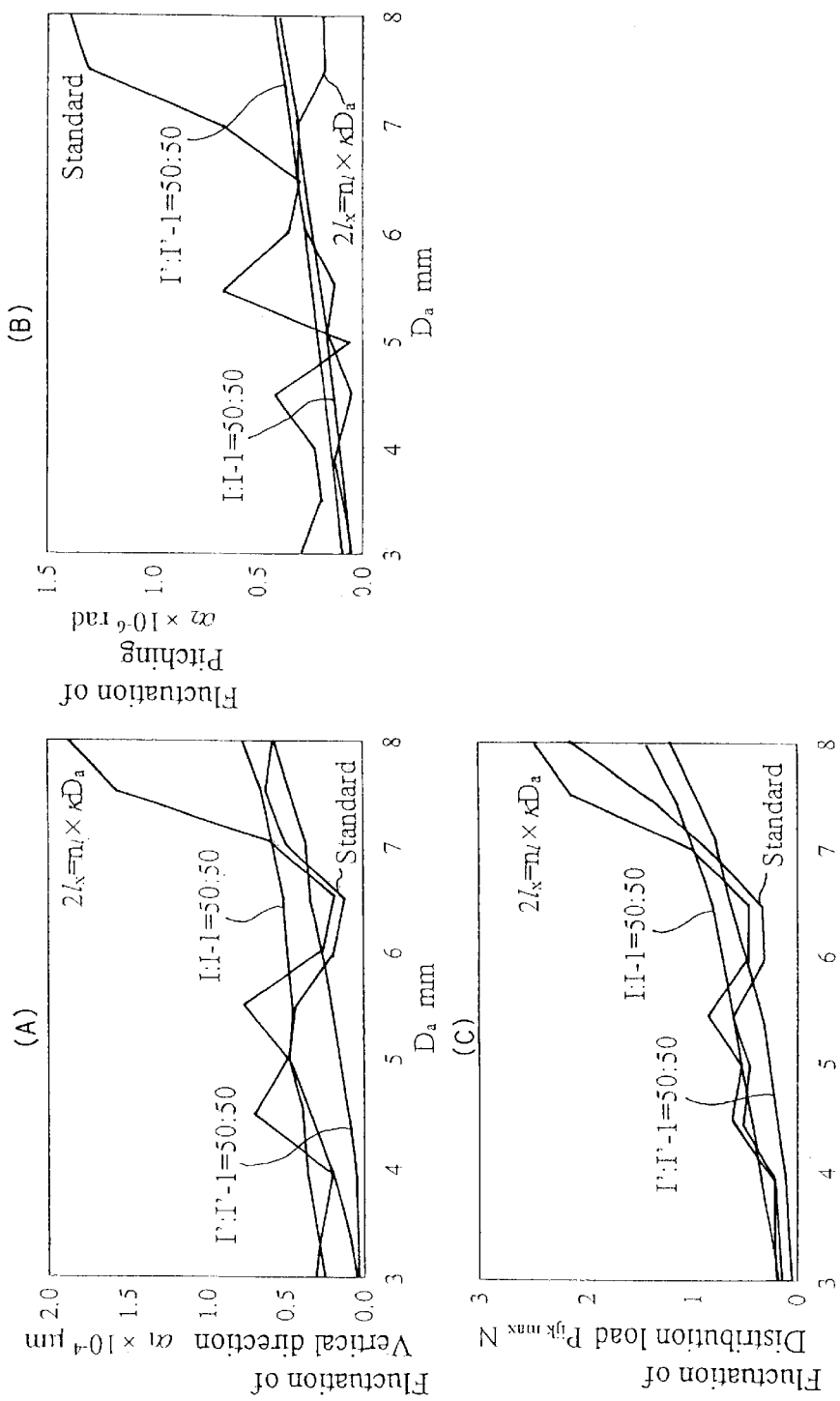

FIG. 15 shows the graph representing an analysis result No. 5 "fluctuation due to ball diameters", in which, the analysis results No. 3 to No. 5 are described on the same graph. In the Standard state (Standard) in which the phases of the movable blocks 2 are not coincident with each other and the ratio of the number of effective balls is not set, the fluctuation is not proportional to the ball diameter. By making coincident the phases of the movable blocks ($2Lx=n1\times\kappa Da$), the pitching precision is made considerably high and is almost proportional to the ball diameter. When the ratio of the variation of the number of effective balls is made constant at the respective ball diameters (I:I−1=50: 50, I':I'−1=50: 50), thus firstly providing a simple proportion of the ball diameter.

Figure 16:
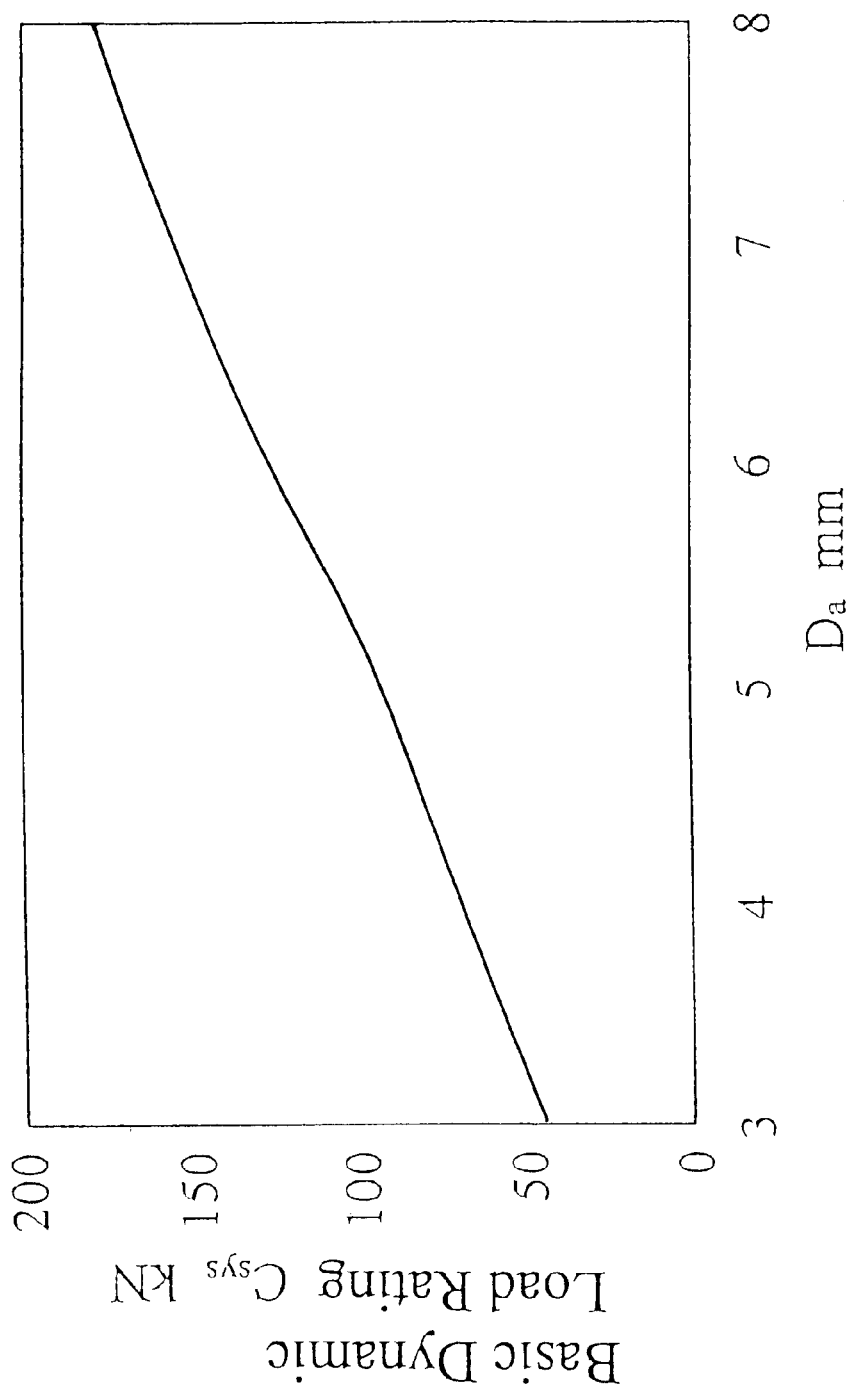
FIG. 16 is a graph showing a basic dynamic load rating due to the ball diameter.

FIG. 16 shows an analysis result No. 6 "basic dynamic load rating due to ball diameter", in which a basic dynamic load rating is shown as a system provided with four blocks. The basic dynamic load rating was calculated in accordance with the following expression.

$$S_t = 2U_x \qquad \text{[Expression 9]}$$

$$Q_{cg} = K_c(2U_x)^{-0.3}(2\kappa D_a)^{\frac{1}{3}}$$

$$Q_{cr} = K_c\left\{\frac{18}{19}(2U_x)\right\}^{-0.3}(2\kappa D_a)^{\frac{1}{3}}$$

$$C_{sys} = (2K)^{0.7} I \sin\beta\left(Q_{cb}^{-\frac{10}{3}} + Q_{cr}^{-\frac{10}{3}}\right)^{-0.3}$$

Qcg: rolling member load (N) with respect to entire one row of block
Qcr: rolling body load (N) with respect to entire one row of rail
Csys: basic dynamic load rating of entire system
Kc: proportional constant (determined by shape of contact portion)
I: number of effective balls in design
β: contact angle (deg)
K: number of blocks (4)

As can be seen form FIG. 16, it is found that the basic dynamic load rating is simply proportional to the ball diameter.

Figure 17:
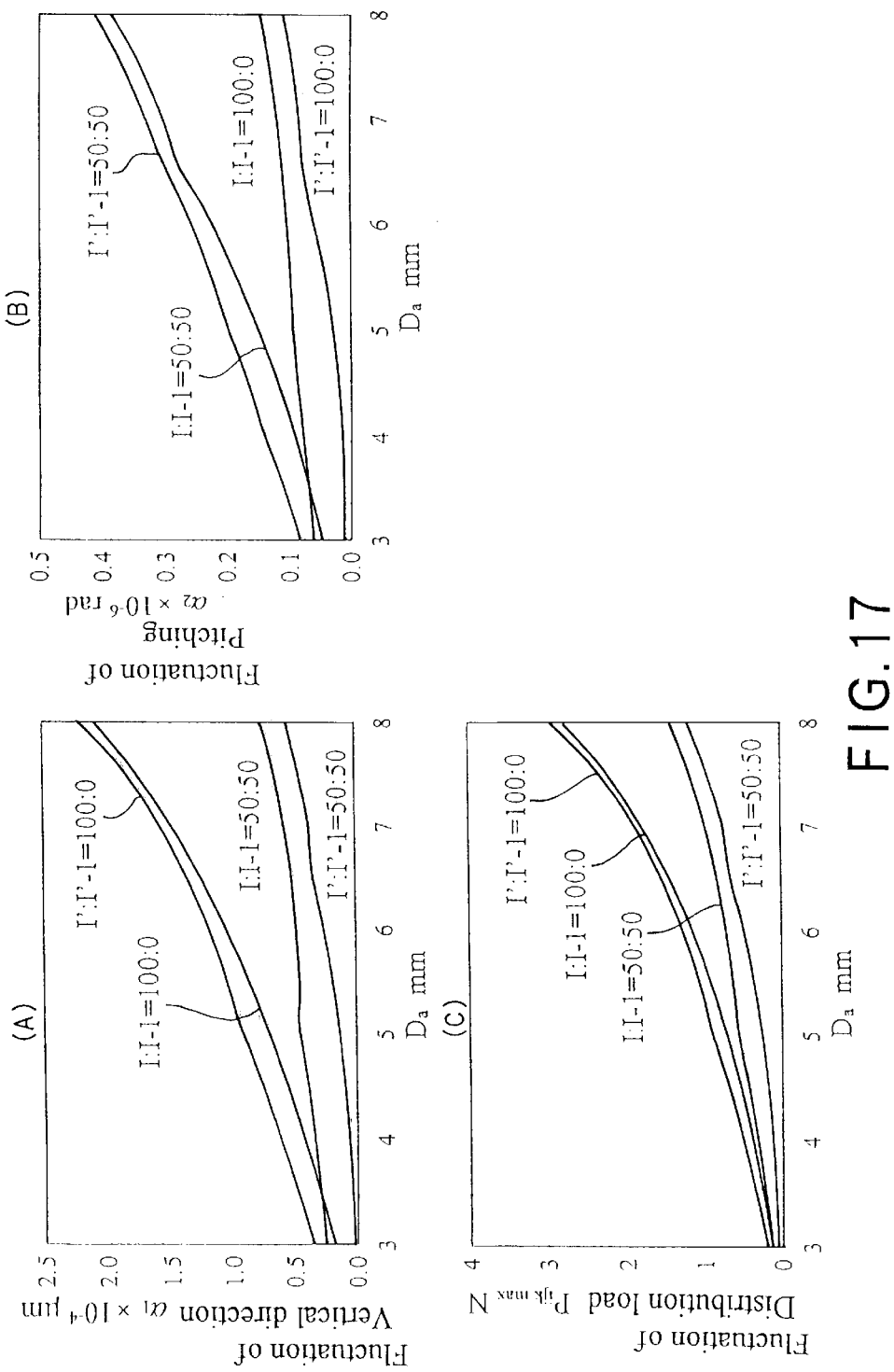

FIG. 17 shows the graph representing an analysis result No. 7 "fluctuation due to ball diameter", in which, as mentioned above, the block spans are adjusted so as to make coincident the relative position of the balls 4 with each other in the movable blocks in the longitudinal forward and rearward direction. Furthermore, the raceway surface length and the ball diameter are determined such that the ratio of the range in which the number of effective balls is I and the range of the number of effective balls is I−1, at the 2 κ Da stroke of the movable block at which the relative position of the respective balls and the movable blocks varies, is 100%:0%. This is determined in both the number of effective balls in design and the actual number thereof. That is, variable conditions are set to the following values.

EXPRESSION 10

2Ux=ni×κ Da mm (ni: optional)
2l$x$=n1×2 κ Da mm (n1: integer)
∴1$x$01:=1$x$02
ni is a value in which 2Ux approaches 80.4 mm.
n1 is a value in which 2l$x$ approaches 250 mm.

The ni is a value such that, in the stroke of 2 κ Da, the number of effective balls in design becomes I:I−1=50:50, I:I−1 =100:0, and the actual number of effective balls becomes I':I'−1=50:50 and I':I'−1.

As shown in FIG. 17, when the ratio is 100%:0%, it will be found that the respective fluctuations are proportional to the ball diameter. Further, the fluctuation in the pitching angle can be made extremely small at the time of the ratio being 100%:0% in comparison with the ratio of 50%:0%.

Figure 18:
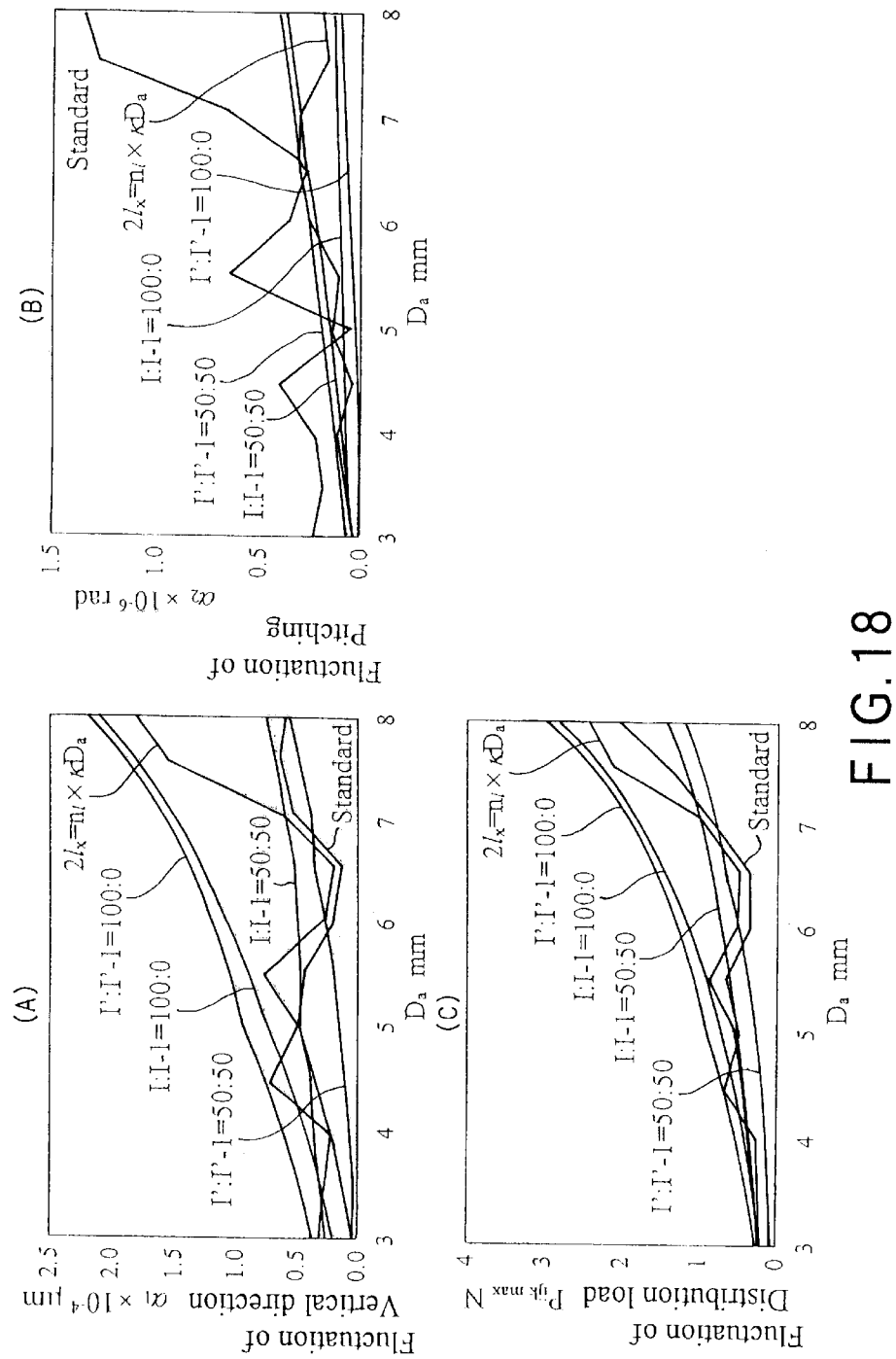

FIG. 18 shows the graph representing an analysis result No. 8 "fluctuation due to ball diameter", which shows a case overlapping the case of the ratio of I:I−1=100%:0% to the analysis result No. 5 of FIG. 15. As shown in FIG. 18, at the first time, the pitching precision can be particularly enhanced by making the phases of the movable blocks 2 coincident with each other (2l$x$=n1×κ Da). Next, by setting the ratio (I:I−1) of the variation of the number of effective balls to 50:50, the pitching precision can be made enhanced and the rigidity in the radial direction can be also enhanced. Furthermore, the pitching precision can be further enhanced by setting the ratio (I:I−1) of the variation of the number of effective balls to 100:0.

Figure 19:
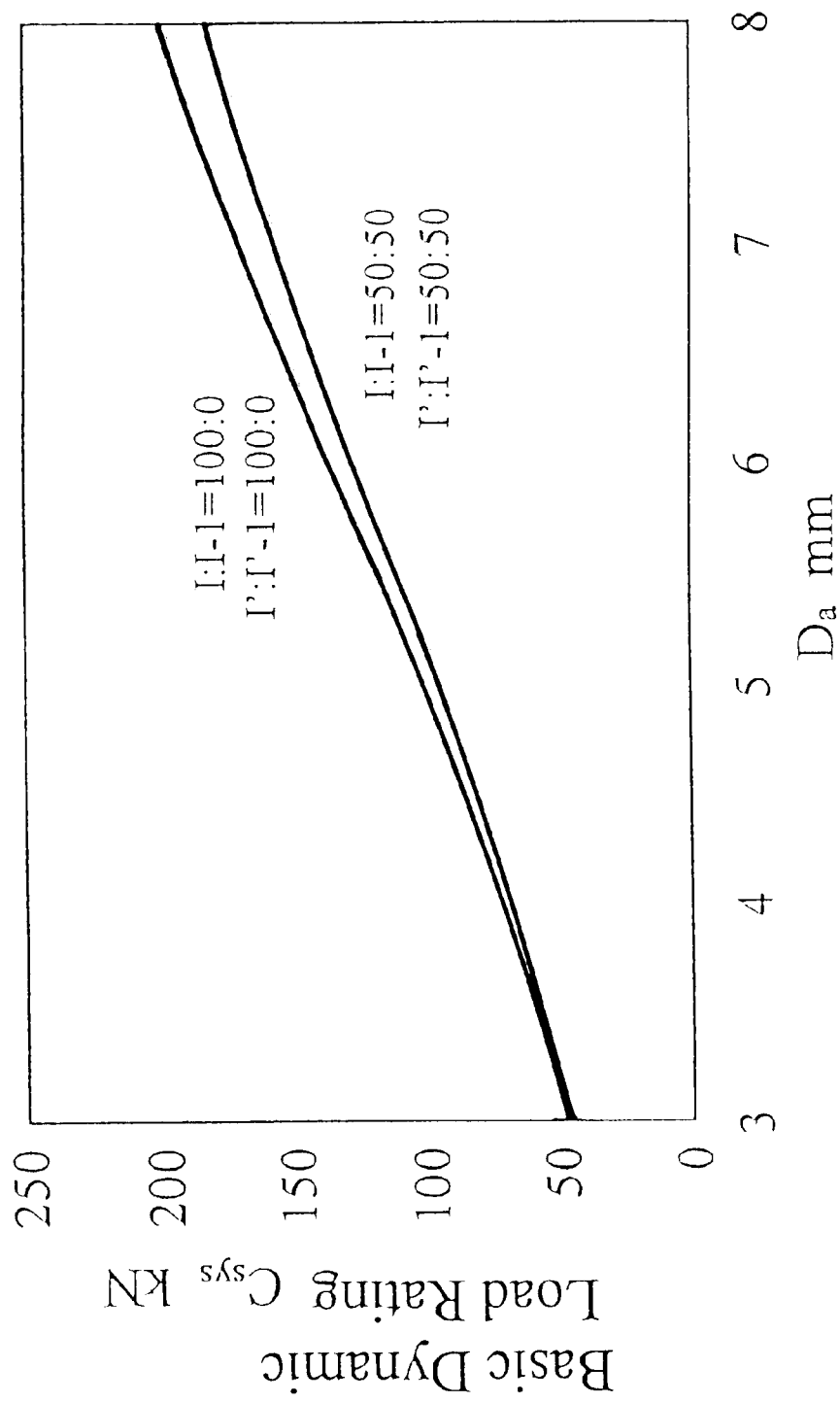
FIG. 19 is a graph showing a basic dynamic load rating due to the ball diameter.

FIG. 19 shows a graph representing an analysis result No. 9 "basic dynamic load rating due to ball diameter", and the same calculation expression as that of the analysis result No. 6 is utilized for the calculation expression of the basic dynamic load rating.

The following conclusion will be obtained from the above analysis results No. 1 to No. 9.

It was found that the precision and the rigidity of the linear motion ball guide system in the case of the predetermined block length are made high as the ball diameter decreases, in which the rigidity is assumed from the displacement α1 in the vertical direction and the rigidity increases as the displacement α1 decreases. The basic dynamic load rating giving influence to the life time can be expanded as the ball diameter increases.

Furthermore, it was also found that an influence due to the difference, in the forward and rearward movable blocks, of the relative positions of the balls in the movable blocks is considerably large.

Still furthermore, it was also found that the influence based on the variation ratio of the number of effective balls which vary in the stroke is large. As the variation of the number of effective balls due to the stroke becomes less (as (I:I−1) approaches 100%:0%), the influence of the ball diameter to the pitching precision decreases. And on the other hand, this variation becomes more (as (I:I−1) approaches 50%:50%), the influence of the ball diameter to the fluctuation of the rigidity and the maximum distribution load becomes less.

However, in actual, because the block span is set by a user and the raceway surface length is preliminarily determined, it is difficult to simply say that as the ball diameter decreases, the performance can be enhanced. Then, an instantaneous application of the existing machine will be performed by a minute adjustment of the block span by the user. If a small specific design is allowed to the existing machine, the crowning shape is adjusted by confirming the actual load condition and making optimum the variation ratio of the number of effective balls.

The following Table 1 shows examples of the rolling body pitch κ Da, the raceway surface (block) length 2Ux, the block span 2l$x$ and the basic dynamic load rating C, in which "κ" is set to κ=1.003 and the block length 2Ux is set to approach the set value of 80.4 mm mentioned before. By setting and determining the respective conditions to the values shown in this Table 1, it becomes possible to enhance the pitching precision and the precision in the radial direction of the linear motion ball guide system. Further, it is to be noted that the values described in this Table 1 are mere examples and many other values may be adopted as far as the former expressions mentioned hereinbefore is satisfied.

TABLE 1

κD$_a$ − 2U$_x$(n$_1$) − 2l$_x$(n$_1$) − C

| κ = 1.003 | | | 2Ux | | 2Ux | | 2Ux | | 2Ux | |
|---|---|---|---|---|---|---|---|---|---|---|
| Da | 2l$x$ | nl | I:I−1 = 50:50 | nl | I:I−1 = 100:0 | nl | I':I'−1 = 50:50 | nl' | I':I'−1 = 100:0 | nl' |
| 3.0 | 252.756 | 42 | 79.7 | 26.487 | 81.2 | 26.986 | 78.7 | 26.155 | 80.2 | 26.653 |
| 3.5 | 252.756 | 36 | 78.95 | 22.490 | 80.7 | 22.988 | 78.0 | 22.219 | 79.7 | 22.703 |
| 4.0 | 248.744 | 31 | 78.2 | 19.492 | 80.7 | 20.115 | 77.2 | 19.242 | 79.3 | 19.766 |
| 4.5 | 252.756 | 28 | 78.9 | 17.481 | 81.2 | 17.990 | 78.1 | 17.304 | 80.4 | 17.813 |
| 5.0 | 250.750 | 25 | 77.7 | 15.494 | 80.2 | 15.992 | 76.9 | 15.334 | 79.4 | 15.833 |
| 5.5 | 253.759 | 23 | 79.9 | 14.484 | 82.7 | 14.991 | 79.3 | 14.375 | 82.0 | 14.864 |
| 6.0 | 252.756 | 21 | 81.2 | 13.493 | 84.2 | 13.991 | 80.7 | 13.410 | 83.7 | 13.908 |
| 6.5 | 224.741 | 19 | 81.4 | 12.486 | 84.7 | 12.992 | 81.1 | 12.440 | 84.3 | 12.930 |
| 7.0 | 252.756 | 18 | 80.7 | 11.494 | 84.2 | 11.993 | 80.3 | 11.437 | 83.8 | 11.936 |
| 7.5 | 255.765 | 17 | 78.9 | 10.489 | 82.7 | 10.994 | 78.6 | 10.449 | 82.3 | 10.941 |
| 8.0 | 256.768 | 16 | 76.1 | 9.484 | 80.2 | 9.995 | 75.8 | 9.447 | 79.8 | 9.945 |

TABLE 1-continued $\kappa D_a - 2U_x(n_1) - 21_x(n_1) - C$

| | κ = 1 003 | 2Ux | | | | | 2Ux | | | | |
|---|---|---|---|---|---|---|---|---|---|---|---|
| Da | Kc | 11-1 = 50:50 | 1 | Qcg | Qcr | C | 11-1 = 100:0 | 1 | Qcg | Qcr | C |
| 3.0 | 1.50063E+03 | 79.7 | 26 | 733.9 | 745.9 | 47363.2 | 81.2 | 27 | 729.8 | 741.8 | 48910.6 |
| 3.5 | 2.07426E+03 | 78.95 | 22 | 1071.0 | 1088.5 | 58482.6 | 80.7 | 23 | 1064.0 | 1081.4 | 60740.1 |
| 4.0 | 2.74566E+03 | 78.2 | 19 | 1486.4 | 1510.7 | 70099.5 | 80.7 | 20 | 1472.5 | 1496.6 | 73095.6 |
| 4.5 | 3.51614E+03 | 78.9 | 17 | 1974.5 | 2006.8 | 83314.4 | 81.2 | 18 | 1957.6 | 1989.6 | 87458.1 |
| 5.0 | 4.38689E+03 | 77.7 | 15 | 2563.3 | 2605.2 | 95433.9 | 80.1 | 16 | 2539.1 | 2580.6 | 100833.6 |
| 5.5 | 5.35897E+03 | 79.9 | 14 | 3205.4 | 3257.8 | 111384.2 | 82.7 | 15 | 3172.4 | 3224.3 | 118113.5 |
| 6.0 | 6.43336E+03 | 81.2 | 13 | 3942.1 | 4006.6 | 127200.4 | 84.2 | 14 | 3899.5 | 3963.2 | 135502.2 |
| 6.5 | 7.61094E+03 | 81.4 | 12 | 4786.3 | 4864.6 | 142558.7 | 84.7 | 13 | 4729.6 | 4806.9 | 152608.3 |
| 7.0 | 8.89254E+03 | 80.7 | 11 | 5747.0 | 5841.0 | 156908.5 | 84.2 | 12 | 5674.3 | 5767.0 | 169006.5 |
| 7.5 | 1.02789E+04 | 78.9 | 10 | 6843.7 | 6955.6 | 169864.7 | 82.7 | 11 | 6747.8 | 6858.1 | 184233.0 |
| 8.0 | 1.17709E+04 | 76.1 | 9 | 8094.7 | 8227.1 | 180824.2 | 80.2 | 10 | 7968.3 | 8098.6 | 197777.7 |

| | κ = 1.003 | 2Ux | | | | | 2Ux | | | | |
|---|---|---|---|---|---|---|---|---|---|---|---|
| Da | Kc | I'T-1 = 50:50 | I | Qcg | Qcr | C | I'T-1 = 100:0 | I | Qcg | Qcr | C |
| 3.0 | 1.50063E+03 | 78.7 | 26 | 736.7 | 748.8 | 47543.0 | 80.2 | 27 | 732.6 | 744.5 | 49092.7 |
| 3.5 | 2.07426E+03 | 78.0 | 22 | 1074.9 | 1092.5 | 58695.4 | 79.7 | 23 | 1068.0 | 1085.4 | 60967.7 |
| 4.0 | 2.74566E+03 | 77.2 | 19 | 1492.2 | 1516.6 | 70370.7 | 79.3 | 20 | 1480.2 | 1504.4 | 73480.4 |
| 4.5 | 3.51614E+03 | 78.1 | 17 | 1980.5 | 2012.9 | 83569.5 | 80.4 | 18 | 1963.4 | 1995.5 | 87718.3 |
| 5.0 | 4.38689E+03 | 76.9 | 15 | 2571.3 | 2613.3 | 95730.6 | 79.4 | 16 | 2546.7 | 2588.3 | 101137.3 |
| 5.5 | 5.35897E+03 | 79.3 | 14 | 3212.7 | 3265.2 | 111636.4 | 82.0 | 15 | 3180.5 | 3232.6 | 118415.0 |
| 6.0 | 6.43336E+03 | 80.7 | 13 | 3949.4 | 4014.0 | 127436.3 | 83.7 | 14 | 3906.4 | 3970.3 | 135744.5 |
| 6.5 | 7.61094E+03 | 81.1 | 12 | 4791.6 | 4869.9 | 142716.7 | 84.3 | 13 | 4736.3 | 4813.7 | 152825.1 |
| 7.0 | 8.89254E+03 | 80.3 | 11 | 5755.6 | 5849.7 | 157142.6 | 83.8 | 12 | 5682.4 | 5775.3 | 169248.1 |
| 7.5 | 1.02789E+04 | 78.6 | 10 | 6851.5 | 6963.5 | 170059.0 | 82.3 | 11 | 6757.6 | 6868.1 | 184501.1 |
| 8.0 | 1.17709E+04 | 75.8 | 9 | 8104.3 | 8236.8 | 181038.6 | 79.8 | 10 | 7980.2 | 8110.7 | 198074.5 |

Furthermore, it is also noted that, in the above descriptions, although the linear motion ball guide system was explained as an object to be analyzed, the present invention is not limited to the linear motion ball guide device and may be applicable to a motion rolling guide device using rollers as rolling bodies. Other motion rolling guide devices utilizing ball bush, ball spline and the like may be also applicable. Still furthermore, the present invention may be applicable to a device having a short retainer structure in which rolling bodies are not circulated. A curvelinear rail members may be utilized in place of the linear rail members.

What is claimed is:

1. A method of determining a raceway surface length (2Ux) of a movable member and a diameter (Da) of a rolling body of a motion rolling guide device which comprises: a track rail; a movable member having a race way surface opposing to the track rail; and rolling bodies disposed between the raceway surface and the track rail; wherein the rolling bodies roll in accordance with the movement of the movable member with respect to the track rail and a relative position of the rolling bodies ad the movable block varies, wherein the raceway surface length (2Ux) is substantially equal to integral multiples of a retainer pitch (κ Da), wherein 2Ux is the surface length of raceway surface of the movable member, and if the motion rolling guide device has a retainer, κ Da is a retainer pitch, κ Da is a (1.000 ≈1.005) Da, where Da is the diameter of the rolling body and κhas a value in the range of 1.000 to 1.005.

2. A motion rolling guide device comprising: a track rail; a movable member having a race way surface opposing to the track rail; and a rolling bodies disposed between the raceway surface and the track rail; wherein the rolling bodies roll in accordance with the movement of the movable member with respect to the track rail and a relative position of the rolling bodies and the movable block varies, wherein a length (2Ux) of the raceway surface of the movable member and a diameter (Da) of the rolling body are determined such that the raceway surface length (2Ux) is substantially equal to integral multiples of a retainer pitch (κ Da), wherein 2Ux is the surface length of raceway surface of the movable member, and if the motion rolling guide device has a retainer, κ Da is a retainer pitch, and if the motion rolling guide device has no retainer, κDa is a (1.000 ≈1.005) Da, where Da is the diameter of the rolling body and κ has a value in the range of 1.000 to 1.005.

3. A motion rolling guide system comprising a track rail, at least one movable member, having raceway surface opposing to the track rail, mounted to the track rail to be movable and rolling bodies disposed between the track rail and the movable member, wherein the rolling bodies roll in accordance with the movement of the movable member with respect to the track rail and a relative position of the rolling bodies and the movable block varies, wherein a length (2Ux) of the raceway surface of the movable member and a diameter (Da) of the rolling body are determined such that the raceway surface length (2Ux) is substantially equal to integral multiples of a retainer pitch (κ Da), wherein 2Ux is the surface length of raceway surface of the movable member, and if the motion rolling guide device has a retainer, κ Da is a retainer pitch, and if the motion rolling guide device has no retainer, K Da is a (1.000 ≈1.005) Da, where Da is the diameter of the rolling body and κ has a value in the range of 1.000 to 1.005.

4. A motion rolling guide system comprising a track rail, a plurality of movable members are mounted to the track rail in a direction the track rail is elongated and number of rolling bodies disposed between the track rail and the movable members, wherein the rolling bodies roll in accordance with the movement of the movable member with respect to the track rail and a relative position of the rolling bodies and the movable block varies, wherein spans of the movable members are adjusted so that relative positions of the rolling bodies in the respective movable members accord with each other and in a state where the movable members are at rest, distances ($Lx01$, $Lx02$) between one end surface of the respective movable member and a first rolling body are coincident with each other.

5. A motion rolling guide system according to claim 4, wherein said track rail comprises a plurality of track shafts, a plurality of movable members are mounted to the respective track shafts, and the spans of the movable members are adjusted so that relative positions of the rolling bodies in the movable members are mounted to the respective track shafts accord with each other.

6. A motion rolling guide system according to claim 4, wherein a length ($2Ux$) of a raceway surface of the movable member and a diameter ($Da$) of the rolling body are determined such that the raceway surface length ($2Ux$) is substantially equal to integral multiples of a retainer pitch ($\kappa Da$), wherein $2Ux$ is the surface length of raceway surface of the movable member, and if the motion rolling guide device has a retainer, $\kappa Da$ is a retainer pitch, and if the motion rolling guide device has not retainer, $\kappa Da$ is a retainer pitch, and if the motion rolling guide device has not retainer, $\kappa Da$ is a $(1.000 \approx 1.005) Da$, where $Da$ is the diameter of the rolling body and $\kappa$ has a value in the range of 1.000 to 1.005.

* * * * *